US011116029B2

(12) United States Patent
Iwai et al.

(10) Patent No.: US 11,116,029 B2
(45) Date of Patent: Sep. 7, 2021

(54) MOBILITY MANAGEMENT ENTITY, NETWORK ENTITY, AND METHOD AND COMPUTER READABLE MEDIUM THEREFOR

(71) Applicant: NEC CORPORATION, Tokyo (JP)

(72) Inventors: Takanori Iwai, Tokyo (JP); Nobuhiko Itoh, Tokyo (JP); Ling Xu, Tokyo (JP); Kenki Takagi, Tokyo (JP); Toshiyuki Tamura, Tokyo (JP); Tomoaki Hokao, Tokyo (JP); Naoaki Suzuki, Tokyo (JP); Hisashi Futaki, Tokyo (JP); Sadafuku Hayashi, Tokyo (JP); Kazuki Eguchi, Tokyo (JP); Kouichi Kimura, Tokyo (JP); Hiroki Aoki, Tokyo (JP); Hideki Bessho, Tokyo (JP); Yoshinori Watanabe, Tokyo (JP); Tooru Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/345,833

(22) PCT Filed: Jul. 31, 2017

(86) PCT No.: PCT/JP2017/027693
§ 371 (c)(1),
(2) Date: Apr. 29, 2019

(87) PCT Pub. No.: WO2018/078987
PCT Pub. Date: May 3, 2018

(65) Prior Publication Data
US 2019/0254108 A1 Aug. 15, 2019

(30) Foreign Application Priority Data
Oct. 31, 2016 (JP) .............................. JP2016-213757

(51) Int. Cl.
H04W 76/27 (2018.01)
H04W 68/00 (2009.01)
(Continued)

(52) U.S. Cl.
CPC ............. *H04W 76/27* (2018.02); *H04W 8/26* (2013.01); *H04W 68/005* (2013.01);
(Continued)

(58) Field of Classification Search
CPC ..... H04W 76/27; H04W 88/08; H04W 88/18; H04W 8/26; H04W 76/11; H04W 68/005
See application file for complete search history.

(56) References Cited

U.S. PATENT DOCUMENTS

2015/0257051 A1* 9/2015 Rao ................... H04W 36/0066
455/439
2016/0029359 A1* 1/2016 Agiwal ................. H04W 72/04
370/329
(Continued)

FOREIGN PATENT DOCUMENTS

WO 2014/209007 A1 12/2014
WO 2016/163036 A1 10/2016

OTHER PUBLICATIONS

Yun Chao Hu et al., "Mobile Edge Computing A key technology towards 5G", ETSI White Paper No. 11, Sep. 2015, 16 pages.
(Continued)

Primary Examiner — Thai Nguyen
(74) Attorney, Agent, or Firm — Sughrue Mion, PLLC

(57) ABSTRACT

A network entity (5) sends, to a mobility management entity (6) or a subscriber server (9), a request message in order to configure the mobility management entity (6) to report a second identifier to be used by a radio access network node (2) for identifying a radio terminal (1). Further, the network entity (5) receives the second identifier from the mobility management entity (6) directly or through the subscriber server (9) and communicates with the radio access network node (2) by using the second identifier. It is thus, for example, possible to allow an MEC server (or an MEC application hosted on the MEC server) and the radio access
(Continued)

network (RAN) node to directly exchange therebetween control messages regarding a specific radio terminal.

18 Claims, 22 Drawing Sheets

(51) Int. Cl.
    *H04W 76/11*     (2018.01)
    *H04W 8/26*     (2009.01)
    *H04W 88/18*     (2009.01)
    *H04W 88/08*     (2009.01)

(52) U.S. Cl.
    CPC ............ *H04W 76/11* (2018.02); *H04W 88/08* (2013.01); *H04W 88/18* (2013.01)

(56) References Cited

U.S. PATENT DOCUMENTS

| | | | |
|---|---|---|---|
| 2018/0139651 A1* | 5/2018 | Kim | .......... H04L 29/12 |
| 2018/0249389 A1* | 8/2018 | Zhu | .......... H04W 36/0033 |
| 2019/0380028 A1* | 12/2019 | Rasanen | .......... H04W 4/00 |
| 2020/0068340 A1* | 2/2020 | Rasanen | .......... H04W 60/04 |

OTHER PUBLICATIONS

"Mobile-Edge Computing (MEC); Service Scenarios", The European Telecommunications Standards Institute, ETSI GS MEC-IEG 004 V1.1.1; Nov. 2015, 16 pages.

"Session management with flexible UP GW(s) assignment", NEC, 3GPP TSG-SA WG2 Meeting #116 S2-163937, Jul. 2016, 5 pages.

"Local Breakout for Ultra-Low Latency Communications", Intel Corporation, 3GPP TSG-RAN WG3 #93 R3-161575, Aug. 2016, 8 pages.

International Search Report for PCT/JP2017/027693 dated Oct. 17, 2017 [PCT/ISA/210].

Kisuk Kweon et al., "Energy Efficient IP Reachability for Push Service in NATted LTE Systems", 2014 IEEE International Conference on Communications (ICC), IEEE, Mobile and Wireless Networking Symposium, (Jun. 10, 2014), pp. 2526-2531, XP032632653, 6 pages total.

"Digital cellular telecommunications system (Phase 2+) (GSM); Universal Mobile Telecommunications System (UMTS); LTE; Architecture enhancements to facilitate communications with packet data networks and applications (3GPP TS 23.682 version 13.7.0 Release 13)", ETSI Technical Specification, European Telecommunications Standards Institute, ETSI TS 123 682 V13.7.0 (Oct. 2016), pp. 1-94, XP014279966, 94 pages total.

Extended European Search Report dated Apr. 7, 2020, from the European Patent Office in Application No. 17864766.5.

Japanese Office Action for JP Application No. 2018-547131 dated Apr. 27, 2021 with English Translation.

Convida Wireless, "Clarification of MTC-IWF and SCEF connection possibilities", 3GPP TSGSA WG2 Meeting #116bis, S2-165297, Sep. 3, 2016, China.

Ericsson, "T6b reference point for NonIP-GPRS", 3GPP TSG-CT WG4 Meeting #74, C4-164223, Jul. 29, 2016, Spain.

\* cited by examiner

1

MOBILITY MANAGEMENT ENTITY, NETWORK ENTITY, AND METHOD AND COMPUTER READABLE MEDIUM THEREFOR

CROSS REFERENCE TO RELATED APPLICATIONS

This application is a National Stage of International Application No. PCT/JP2017/027693 filed Jul. 31, 2017, claiming priority based on Japanese Patent Application No. 2016-213757 filed Oct. 31, 2016, the disclosure of which is incorporated herein in its entirety by reference.

TECHNICAL FIELD

The present disclosure relates to a mobile communication network, and in particular, to an apparatus and a method for mobile edge computing.

BACKGROUND ART

The European Telecommunications Standards Institute (ETSI) has started standardization of Mobile Edge Computing (MEC) (see Non-Patent Literature 1 and 2). The MEC offers, to application developers and content providers, cloud-computing capabilities and an information technology (IT) service environment in the Radio Access Network (RAN) in close proximity to mobile subscribers. This environment provides ultra-low latency and high bandwidth as well as direct access to radio network information (subscriber's location, cell load etc.) that can be leveraged by applications and services.

The MEC server is integrally arranged with a RAN node. Specifically, the MEC server can be deployed at any one of the following sites: at a Long Term Evolution (LTE) base station (eNodeB) site, a 3G Radio Network Controller (RNC) site, and at a cell aggregation site. The cell aggregation site can be located indoors within an enterprise (e.g., a hospital, a large corporate headquarters), or indoors/outdoors in a public building or arena (e.g., a shopping mall, a stadium) to control a large number of local access points.

The MEC server provides applications (MEC applications) with computing resources, storage capacity, connectivity, and access to user traffic and radio network information. More specifically, the MEC server provides a hosting environment for applications by providing Infrastructure as a Service (IaaS) facilities or Platform as a Service (PaaS) facilities.

MEC is based on a virtualized platform, similar to Network Function Virtualization (NFV). While NFV focuses on network functions, MEC enables applications to be run at the edge of the network. The infrastructure that hosts MEC is quite similar to the infrastructure that hosts NFV or network functions. Accordingly, it is beneficial to reuse the infrastructure and infrastructure management of NFV for MEC by hosting both Virtual Network Functions (VNFs) and MEC applications on the same platform.

CITATION LIST

Non Patent Literature

[Non-Patent Literature 1] Yun Chao Hu, Milan Patel, Dario Sabella, Nurit Sprecher, and Valerie Young, ETSI White Paper No. 11 "Mobile Edge Computing A key technology toward 5G" First edition, the European Telecommunications Standards Institute, September 2015

[Non-Patent Literature 2] ETSI GS MEC-IEG 004 V1.1.1 (2015, November) "Mobile-Edge Computing (MEC); Service Scenarios", the European Telecommunications Standards Institute, November 2015

SUMMARY OF INVENTION

Technical Problem

The inventors have found several problems regarding MEC, for example, problems regarding identification of radio terminals. As described above, MEC is expected to contribute to reduction of delay in applications and services directed to radio terminals, thereby contributing to improving QoE of users. However, in a situation in which, for example, a large number of radio terminals are connected to the RAN, the RAN may not be able to satisfy the delay requirements required by radio terminals that use or relate to MEC. If the MEC server is able to request a RAN node (e.g., a radio base station (eNodeB/RNC)) for a special treatment given to specific radio terminals that use or relate to MEC with regard to radio resource management (RRM), scheduling or the like in the RAN, it may be beneficial to solve this problem.

However, it should be mentioned here that a terminal identifier(s) to be used by the MEC server, or the MEC applications hosted on the MEC server, to identify a radio terminal is different from a terminal identifier(s) to be used by the RAN node (e.g., radio base station) to identify the radio terminal. In other words, there is no common terminal identifier that both the MEC server (or MEC applications hosted on the MEC server) and the RAN node use. It is thus difficult for the MEC server to directly send a control or request message regarding a specific radio terminal to the RAN node.

Specifically, the MEC server and the MEC applications hosted thereon can use an Internet Protocol (IP) address or application layer ID (or name) of a radio terminal to identify the radio terminal. Meanwhile, to identify a radio terminal connected to a RAN node (e.g., radio base station), the RAN node uses identifiers such as a terminal identifier in the RAN (or an Access Stratum (AS)), a terminal identifier on a control connection between the RAN node and the core network, and a bearer (or session) identifier for a data bearer between the RAN node and the core network. For example, a LTE radio base station (i.e., eNB) uses a Cell Radio Network Temporary Identifier (C-RNTI), an eNB UE S1AP ID, an S1 eNB Tunnel Endpoint Identifier (TEID), and the like, to uniquely identify a radio terminal (i.e., UE).

One of the objects to be attained by embodiments disclosed herein is to provide an apparatus, a method, and a program that contribute to allowing an MEC server (or an MEC applications hosted on the MEC server) and a RAN node to directly exchange therebetween control messages regarding a specific radio terminal. It should be noted that the above-described object is merely one of the objects to be attained by the embodiments disclosed herein. Other objects or problems and novel features will be made apparent from the following descriptions and the accompanying drawings.

Solution to Problem

In an aspect, a network entity includes at least one memory and at least one processor coupled to the at least one memory. The at least one processor is configured to send, to a mobility management entity or a subscriber server, a request message in order to configure the mobility management entity to report a second identifier to be used by a radio access network node for identifying a radio terminal. The at least one processor is further configured to receive the second identifier from the mobility management entity directly or through the subscriber server, and communicates with the radio access network node by using the second identifier.

In an aspect, a mobility management entity includes at least one memory and at least one processor coupled to the at least one memory. The at least one processor is configured to receive, from a network entity directly or through a subscriber server, a request message in order to configure the mobility management entity to report a second identifier to be used by a radio access network node for identifying a radio terminal. The at least one processor is further configured to send the second identifier to the network entity directly or through the subscriber server.

In an aspect, a method in a network entity includes:

(a) sending, to a mobility management entity or a subscriber server, a request message in order to configure the mobility management entity to report a second identifier to be used by a radio access network node for identifying a radio terminal;

(b) receiving the second identifier from the mobility management entity directly or through the subscriber server; and (c) communicating with the radio access network node by using the second identifier.

In an aspect, a method in a mobility management entity includes:

(a) receiving, from a network entity directly or through a subscriber server, a request message in order to configure the mobility management entity to report a second identifier to be used by a radio access network node for identifying a radio terminal; and (b) sending the second identifier to the network entity directly or through the subscriber server.

In an aspect, a program includes a set of instructions (software codes) that, when loaded into a computer, causes the computer to perform a method according to one of the above-described aspects.

Advantageous Effects of Invention

According to the above-described aspects, it is possible to provide an apparatus, a method, and a program that contribute to allowing an MEC server (or an MEC application hosted on the MEC server) and a RAN node to directly exchange therebetween control messages regarding a specific radio terminal.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

The following descriptions on the embodiments mainly focus on LTE and LTE-Advanced. However, these embodiments are not limited to being applied to LTE and LTE-Advanced and may be applied to other mobile communication networks or systems such as a 3rd Generation Partnership Project (3GPP) Universal Mobile Telecommunications System (UMTS), a 3GPP2 CDMA2000 system, a Global System for Mobile communications (GSM (Registered Trademark))/General packet radio service (GPRS) system, a WiMAX system, and a mobile WiMAX system. Further, these embodiments may be applied to the fifth generation mobile communication system (5G), which is under standardization by the 3GPP. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

First Embodiment

Figure 1A:
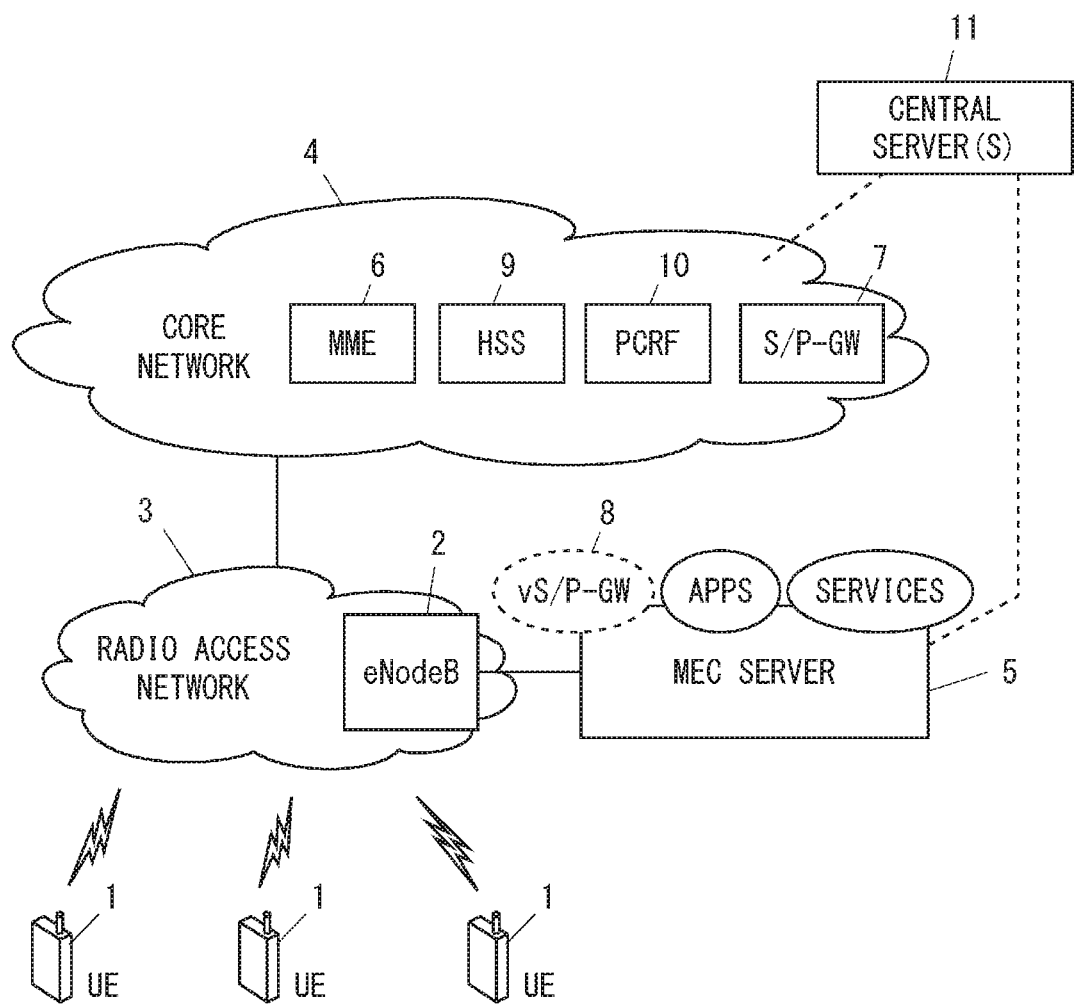
FIG. 1A is a diagram showing a configuration example of a mobile communication network according to several embodiments.

FIG. 1A shows a configuration example of a mobile communication network according to several embodiments including this embodiment. In the example shown in FIG. 1A, the mobile communication network includes a RAN 3 (i.e., Evolved UMTS Terrestrial Radio Access Network (E-UTRAN)) and a core network 4 (i.e., Evolved Packet Core (EPC)). The RAN 3 includes an eNodeB 2. The eNodeB 2, which is arranged in the RAN 3, is configured to communicate with a plurality of radio terminals 1 (i.e., User Equipments (UEs)) connected to the RAN 3 and provide radio resource management for these UEs 1. For example, the radio resource management includes: establishment, modification, and release of a radio connection (e.g., Radio Resource Control (RRC) connection) with each UE 1; scheduling of downlink transmission and uplink transmission of each UE 1 (i.e., radio resource allocation); and controlling of a handover of each UE 1. The eNodeB 2 shown in FIG. 1A may be a macro cell base station or a femto cell base station.

The eNodeB 2 shown in FIG. 1 may be a Digital Unit (DU) in the Centralized Radio Access Network (C-RAN) architecture. The DU is also referred to as a Baseband Unit (BBU) or a Central Unit (CU). In other words, the eNodeB 2 shown in FIG. 1A may be a RAN node connected to one or more Radio Units (RUs). The RU is also referred to as a Remote Radio Heads (RRH), a Remote Radio Equipment (RRE), or a Distributed Unit (DU). In some implementations, the eNodeB 2 serving as the DU (or BBU) is connected to the EPC 4, and is responsible for control-plane processing including radio resource management and for digital baseband signal processing for the user plane. On the other hand, the DU (or RRH) is responsible for analog Radio Frequency (RF) signal processing (e.g., frequency conversion and signal amplification). The C-RAN may also be referred to as a Cloud RAN. Further, the BBU may also be referred to as a Radio Equipment Controller (REC) or a Data Unit (DU). The RRH may also be referred to as a Radio Equipment (RE), a Radio Unit (RU), or a Remote Radio Unit (RRU).

Further, there is another C-RAN architecture in which a part of the baseband signal processing is arranged in the remote site. In some implementations, layer-1 (i.e., physical layer) baseband signal processing may be located in the remote site, and layer-2 (i.e., MAC sublayer, RLC sublayer, and Packet Data Convergence Protocol (PDCP) sublayer) and layer-3 signal processing may be located in the central site. In some implementations, the layer-1 signal processing and a part or all of the layer-2 signal processing may be located in the remote site, and the layer-3 signal processing may be located in the central site. The eNodeB 2 shown in FIG. 1A may be a data unit located in the central site in these C-RAN architectures.

The core network 4 is a network mainly managed by an operator that provides mobile communication services. The core network 4 includes a plurality of control plane entities and a plurality of user plane entities. The control plane entities include, for example, a Mobility Management Entity (MME) 6, a Home Subscriber Server (HSS) 9, and a Policy and Charging Rule Function (PCRF) 10. The user plane entities include, for example, an S/P-GW 7. The S/P-GW 7 includes one or both of a Serving Gateway (S-GW) and a Packet Data Network Gateway (P-GW). The control plane entities including the MME 6 perform various kinds of control for the UEs 1, such as mobility management, session management (or bearer management), subscriber information management, and billing management. The user plane entities including the S/P-GW 7 relay user data of the UEs 1 between the RAN 3 and an external network (i.e., Packet Data Network (PDN)).

A Mobile Edge Computing (MEC) server 5 is arranged in the RAN 3 in such a way that it can directly communicate with a radio access network (RAN) node (that is, without traversing the core network 4). The MEC server 5 may also be referred to as an edge server. In the example shown in FIG. 1A, the MEC server 5 is arranged in the RAN 3 in such a way that it can directly communicate with the eNodeB 2. As described above, the eNodeB 2 may be a BBU. In some implementations, the MEC server 5 may be physically integrated with the eNodeB 2. In some implementations, the MEC server 5 may be installed in the same building (or site) as the eNodeB 2, and may be connected to the Local Area Network (LAN) in this site so that the MEC server 5 can communicate with the eNodeB 2.

The MEC server 5 is configured to provide at least one of computing resources and storage resources (or storage capacities) for edge computing regarding a service or application directed to one or more UEs 1. In some implementations, the MEC server 5 may provide a hosting environment for MEC applications by providing IaaS facilities or PaaS facilities.

The MEC server 5 may further include one or more of the functions of the core network 4. For example, the MEC server 5 may have the S-GW or S/P-GW function and terminate a bearer (e.g., Evolved Packet System (EPS) bearer) of the UE 1 that uses the MEC. As described above, the MEC architecture is similar to the NFV architecture. Accordingly, the MEC server 5 may host network functions including a virtualized S/P-GW (vS/P-GW) 8 as well as the MEC applications.

In some implementations, the MEC server 5 may communicate with one or more central servers 9. The MEC server 5 may communicate with a central server(s) 11 through the core network 4 or through a communication line (or a network) that does not traverse the core network 4. Further, although not shown in FIG. 1A, the MEC server 5 may be connected to a plurality of eNodeBs 2.

The network architecture shown in FIG. 1A is a merely example. For example, the Selected IP Traffic Offload (SIPTO) technique may be used for offloading traffic of the UEs 1 via the MEC server 5 without traversing the EPC 4. The SIPTO is a traffic offloading technique and enables sending of user plane (U-plane) data traffic directly to the Internet or another Internet Protocol (IP) network while bypassing a core network (i.e., EPC). The SIPTO includes "SIPTO above RAN" architecture and "SIPTO at the Local Network" architecture. The "SIPTO above RAN" architecture corresponds to a traffic offload through a PGW located in the mobile operator's core network (i.e., EPC). In contrast, the "SIPTO at the Local Network" architecture corresponds to a traffic offload through an LGW located in the RAN.

The SIPTO at the Local Network function enables an IP capable UE connected via a (H)eNB to access a defined IP network (e.g., the Internet) without the user plane traversing the core network (EPC). The SIPTO at the Local Network can be achieved by selecting an LGW function collocated with the (H)eNB or selecting a stand-alone GW residing in a local network. In any of "SIPTO at the Local Network with stand-alone GW" and "SIPTO at the Local Network with L-GW collocated with the (H)eNB", selected IP traffic is offloaded via the local network. Note that, the local network is synonymous with a Local Home Network (LHN). The local home network is a network composed of an LGW and at least one (H)eNB that has IP connectivity provided by the LGW.

In the SIPTO at the Local Network with stand-alone GW, a stand-alone GW can be used to provide IP connectivity to a plurality of (H)eNBs. The stand-alone GW is located in the local network, and it has both the functionality of Serving GW (SGW) and the functionality of LGW. In contrast, in the SIPTO at the Local Network with L-GW collocated with the (H)eNB, an LGW can be used to provide IP connectivity to the (H)eNB collocated with this LGW.

Figure 1B:
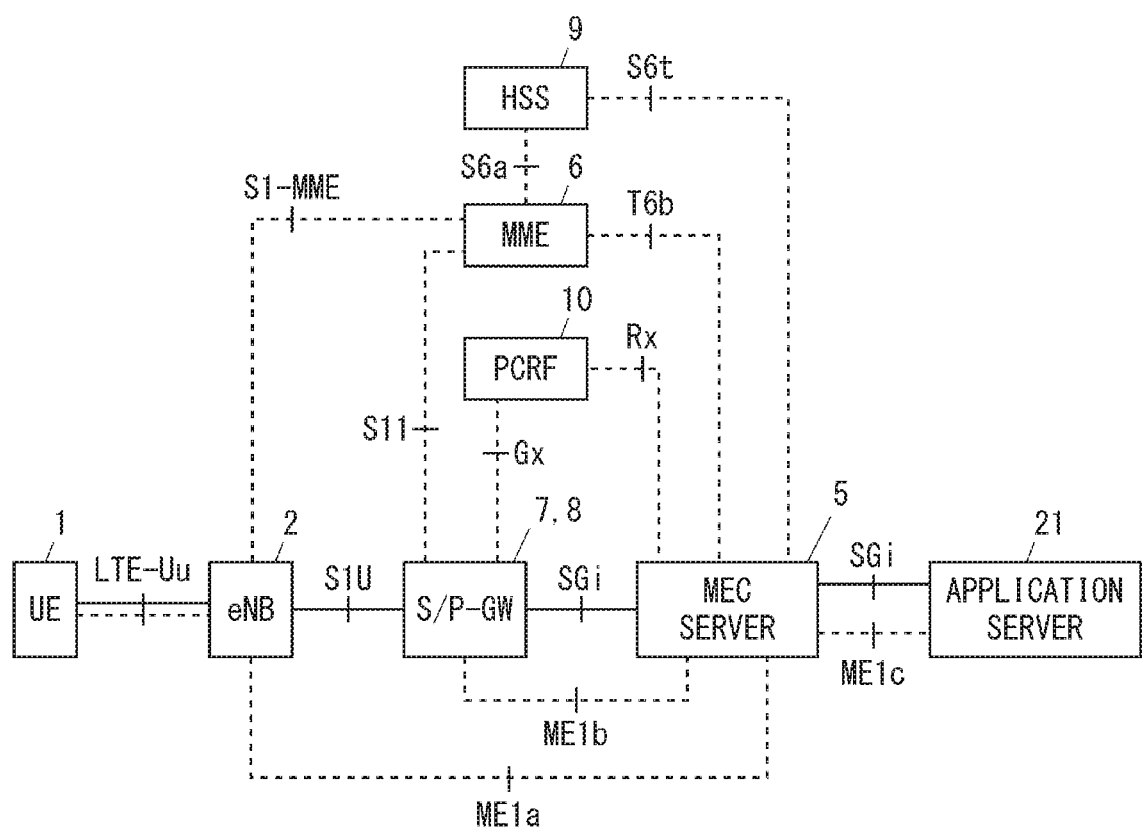
FIG. 1B is a diagram showing examples of interfaces (or reference points) in a mobile communication network according to several embodiments.

FIG. 1B shows examples of interfaces (or reference points) among the entities shown in FIG. 1A. An application server 21 shown in FIG. 1B may be hosted on the MEC server 5. In FIG. 1B, interfaces illustrated with solid lines are user-plane (U-plane) interfaces, while interfaces illustrated with dashed lines are control-plane (C-plane) interfaces. In the example shown in FIG. 1B, the MEC server 5 communicate with the eNodeB 2, the MME 6, the S/P-GW 7 (or 8), the HSS 9, the PCRF 10, and the application server 21 via C-plane interfaces, and also communicate with the S/P-GW 7 (or 8) and the application server 21 via U-plane interfaces. More specifically, as shown in FIG. 1B, may have a T6b interface for communicating with the MME 6, an S6t interface for r communicating with the HSS 9, an Rx interface for communicating with the PCRF 10, a new C-plane interface (e.g., an ME1a interface) for communicating with the eNodeB 2, a new C-plane interface (e.g., an ME1b interface) for communicating with the S/P-GW 7 (or 8), and a new C-plane interface (e.g., an ME1c interface) for communicating with the application server 21. Meanwhile, the MEC server 5 may have an SGi interface for communicating with the S/P-GW 7 (or 8) and an SGi interface for communicating with application server 21.

It can be stated that the MEC server 5 shown in FIG. 1B has the functionality of a Service Capability Exposure Function (SCEF) because it has C-plane interfaces for communicating with the MME 6, the HSS 9 and the PCRF 10. In other words, the MEC server 5 may function as an SCEF specified in the 3GPP standard. Further, it can be stated that the MEC server 5 shown in FIG. 1B has the functionality of a Service Capability Server (SCS) because it has U-plane interfaces for communicating with the S/P-GW 7 (or 8) and the application server 21. In other words, the MEC server 5 may function as an SCS specified in the 3GPP standard.

Next, some examples of a procedure for allowing the eNodeB 2 and the MEC server 5 to use a common UE identifier are described.

First Example

Figure 2:
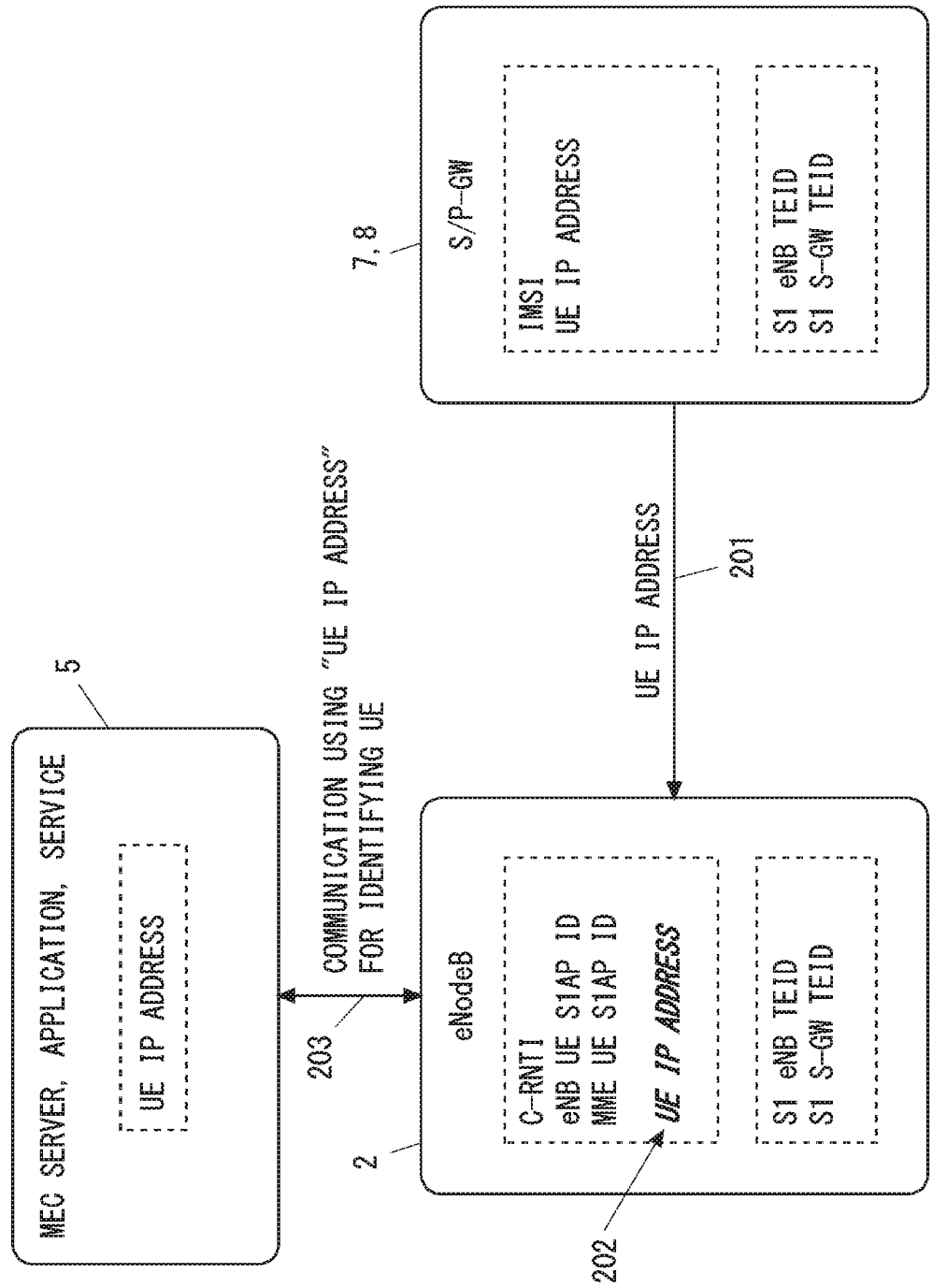
FIG. 2 is a diagram showing one example of operations of an eNodeB, an MEC server, and an S/P-GW according to a first embodiment.

FIG. 2 shows one example of operations of the eNodeB 2, the MEC server 5, and the S/P-GW 7 or 8. The S/P-GW 7 or 8 shown in FIG. 2 means the S-GW alone, the P-GW alone, or both the S-GW and the P-GW. The S/P-GW 7 or 8 may be the S/P-GW 7 arranged in the core network 4 or may be the S/P-GW 8 co-located in the location of the eNodeB 2 along with the MEC server 5. The S/P-GW 8 may be an S/P-GW virtualized on a platform that is the same as or differs from the MEC server 5.

In Step 201, the eNodeB 2 receives, from the S/P-GW 7 or 8, a first identifier that is used by the MEC server 5 or an application(s) (or service(s)) hosted on the MEC server 5 to identify the UE 1. The first identifier is used in the MEC server 5 or in applications (or services) hosted on the MEC server 5 to uniquely identify the UE 1. In the example shown in FIG. 2, the first identifier is a UE IP address (i.e., an IP address of the UE 1).

In some implementations, the eNodeB 2 may receive the first identifier through a user plane tunnel between the S-GW (the S/P-GW 7 or 8) and the eNodeB 2 (i.e., an S1 bearer). The S1 bearer is a GTP tunnel conforming to GTP for User Plane (GTP-U). The eNodeB 2 may acquire the first identifier from, for example, a Private Extension information element contained within a GTP-U signalling message received from the S-GW (the S/P-GW 7 or 8) through the S1 bearer.

In Step 202, the eNodeB 2 associates the first identifier, which has been received from the S/P-GW 7 or 8, with a second identifier that is used by the eNodeB 2 to identify the UE 1. In some implementations, the second identifier uniquely identifies the UE 1 in the eNodeB 2. In some implementations, the second identifier may uniquely identify the UE 1 in a cell provided by the eNodeB 2. In some implementations, the second identifier may uniquely identify the UE 1 on an interface (e.g., an S1-MME interface) between the eNodeB 2 and a control-plane core network node (e.g., the MME 6). In some implementations, the second identifier may uniquely identify the UE 1 or a bearer for the UE 1 on an interface (e.g., S1-U interface) between the eNodeB 2 and a user-plane core network node (e.g., the S/P-GW 7 or 8).

More specifically, the second identifier may be a C-RNTI, an eNB UE S1AP ID, an S1 eNB TEID, or any combination thereof. The second identifier may be a combination of these one or more identifiers and another identifier (e.g., an MME UE S1AP ID, S1 S-GW TEID). The C-RNTI is allocated by the eNodeB 2 and uniquely identifies the UE 1 in a cell provided by the eNodeB 2. The eNB UE S1AP ID is allocated by the eNodeB 2, uniquely identifies the UE 1 on an S1-MME interface between the eNodeB 2 and the MME 6, and also uniquely identifies the UE 1 in the eNodeB 2. The MME UE S1AP ID is allocated by the MME 6, uniquely identifies the UE 1 on an S1-MME interface between the eNodeB 2 and the MME 6, and also uniquely identifies the UE 1 in the MME 6. The S1 eNB TEID is allocated by the eNodeB 2, and identifies a downlink endpoint (i.e., the eNodeB 2 side) of an S1 bearer (i.e., a GTP tunnel) established between the eNodeB 2 and the S-GW (i.e., the S/P-GW 7 or 8). Since the S1 eNB TEID is unique in the eNodeB 2, the S1 eNB TEID is therefore able to identify the UE 1 that uses the S1 bearer uniquely in the eNodeB 2. The S1 S-GW TEID is allocated by the S-GW, and identifies an uplink endpoint (i.e., the S-GW side) of an S1 bearer (i.e., a GTP tunnel) established between the eNodeB 2 and the S-GW (i.e., the S/P-GW 7 or 8). Since the S1 S-GW TEID is unique in the S-GW, the S1 S-GW TEID is therefore able to identify the UE 1 that uses the S1 bearer uniquely in the S-GW (the S/P-GW 7 or 8). The S1 eNB TEID may be referred to as an S1 TEID (DL), while the S1 S-GW TEID may be referred to as an S1 TEID (UL).

The second identifier may include an MME UE S1AP ID, or a combination of an MME UE S1AP ID and an identifier of the MME (e.g., an MME Code (MMEC), an MME Identifier (MMEI), or a Globally Unique MMEI (GUM-MEI)). For example, in an arrangement in which the eNodeB 2 is connected to only one MME 6, the MME UE S1AP ID can be used to uniquely identify the UE 1 in the eNodeB 2. Alternatively, in an arrangement in which the eNodeB 2 is connected to a plurality of MMEs 6, a combination of the MME UE S1AP ID and the MME identifier can be used to uniquely identify the UE 1 in the eNodeB 2.

The second identifier may include an S1 S-GW TEID, or a combination of an S1 S-GW TEID and an S-GW identifier (e.g., an S-GW address). For example, in an arrangement in which the eNodeB 2 is connected to only one S-GW (S/P-GW 7 or 8), the S1 S-GW TEID can be used to uniquely identify the UE 1 in the eNodeB 2. Alternatively, in an arrangement in which the eNodeB 2 is connected to a plurality of S-GWs (S/P-GWs 7 or 8), a combination of the S1 S-GW TEID and the S-GW identifier can be used to uniquely identify the UE 1 in the eNodeB 2.

The eNodeB 2 and the S/P-GW 7 or 8 use a common identifier(s), that is, an S1 eNB TEID and an S1 S-GW TEID, to specify an S1 bearer of the UE 1. Accordingly, the eNodeB 2 is able to associate the first identifier (e.g., the UE IP address) of the UE 1 received from the S/P-GW 7 or 8 with the S1 eNB TEID and the S1 S-GW TEID that is used to specify an S1 bearer of this UE 1. Further, the eNodeB 2 is able to associate the first identifier (e.g., the UE IP address) of the UE 1 with another identifier (e.g., the C-RNTI, the eNodeB UE S1AP ID, or the MME UE S1AP ID) based on the S1 eNB TEID and the S1 S-GW TEID.

Referring back to FIG. 2, in Step 203, the eNodeB 2 communicates with the MEC server 5 using the first identifier (e.g., the UE IP address) to specify the UE 1. In some implementations, in response to receiving a request message containing the first identifier (e.g., the UE IP address) from the MEC server 5, the eNodeB 2 performs the radio resource management regarding the UE 1 identified by the first identifier. For example, the radio resource management includes: establishment, modification, and release of a radio connection (e.g., RRC connection) with the UE 1; scheduling of radio resources for the UE 1; configuration of dedicated scheduling request (D-SR) resources for the UE 1; and controlling of a handover of the UE 1. In some implementations, the MEC server 5 may notify the eNodeB 2 of MEC control information including at least one of delay requirements, throughput requirements, and priority requirements regarding the specific UE 1 identified by the first identifier.

The delay requirements may indicate at least one of a maximum delay, an average delay, a delay jitter, and priority regarding delay guarantee. The delay requirements may indicate a period during which the delay requirements are required, a schedule in which the delay requirements are required, or the number of times that the delay requirements are required. The delay requirements may be configured separately for the uplink and the downlink. The delay here may be, for example, a delay until the UE 1 completes transmission of data to the RAN 3, a delay until the data of the UE 1 arrives at a destination (e.g., the MEC server 5), or a delay until the RAN 3 completes transmission of data to the UE 1.

The throughput requirements may indicate at least one of a lowest throughput (a minimum throughput that should be guaranteed), an average throughput, a requested throughput (sufficient throughput), a minimum radio bandwidth, an average radio bandwidth, and a requested radio bandwidth.

The priority requirements may indicate at least one of: relative or absolute priorities among UEs 1 that use the MEC; and a relative or absolute priority of UEs 1 that use the MEC with respect to other UEs 1 that does not use the MEC.

The mobility requirements may indicate at least one of: whether to guarantee the mobility; and a value or level (e.g. high, medium (or normal), low) of a moving speed for which the mobility is guaranteed.

The MEC control information may indicate a data pattern or an application or service type (e.g., voice, video, Machine-to-Machine (M2M) control command) to specify a data flow(s) to which the MEC control information (e.g., the delay requirements) should be applied. Further or alternatively, the MEC control information may indicate a goal to be accomplished (e.g., completion percentage, number of successes).

The example shown in FIG. 2 can be changed as appropriate. In some implementations, the S/P-GW 7 or 8 may notify the eNodeB 2 of another identifier regarding the UE 1 in addition to the first identifier (e.g., the UE IP address). For example, the S/P-GW 7 or 8 may notify the eNodeB 2 of information indicating a Traffic Flow Template (TFT) regarding an EPS bearer of the UE 1. The TFT is a packet filter to map one or more IP packet flows (Service Data Flows (SDFs)) of the UE 1 to the EPS bearer of the UE 1. The TFT information includes, for example, an IP address of an MEC application with which the UE 1 communicates (i.e., an uplink destination address or a downlink source address).

As described above, in the example shown in FIG. 2, the eNodeB 2 acquires the first identifier that is used by the MEC server 5 or by applications (or services) hosted on the MEC server 5 to identify the UE 1, and associates this first identifier with the second identifier that is used by the eNodeB 2 to identify the UE 1. This allows the eNodeB 2 and the MEC server 5 to use a common UE identifier, i.e., the first identifier. Accordingly, the eNodeB 2 and the MEC server 5 are able to directly exchange therebetween control messages regarding a specific UE 1 by using the first identifier to specify the UE 1.

Further, in some implementations, the configuration in which the S/P-GW 8 notifies the eNodeB 2 of the first identifier (e.g., the UE IP address) has the following advantages over the configuration in which another node (e.g., the MME 6) notifies the eNodeB 2 of the first identifier. In order to allow MEC applications hosted on the MEC server 5 installed in the site of the eNodeB 2 to communicate with a UE 1 on the user plane, the P-GW function for terminating an EPS bearer of this UE 1 is preferably arranged in the eNodeB 2. Accordingly, the arrangement in which an S/P-GW is located in the site of the eNodeB 2 along with the MEC server 5 is considered to be the typical arrangement in MEC. Further, as already described above, the configuration in which the MEC server 5 hosts network functions including the virtualized S/P-GW 8 may also be the typical arrangement in MEC. When the above-described circumstances specific to MEC are taken into account, the configuration in which the virtualized S/P-GW 8 co-located with the eNodeB 2 supplies the first identifier to the eNodeB 2 will probably be achieved easier than the configuration in which the MME 6 in the core network 4 supplies the first identifier to the eNodeB 2. This is because the virtualized S/P-GW 8 can be hosted on the MEC server 5 for MEC and the software of the virtualized S/P-GW 8 can be easily modified. On the other hand, it is assumed that the MME 6 is not dedicated to MEC and is also used for normal cellular communications.

Furthermore, as described above, in some implementations, a Private Extension information element contained within a GTP-U signalling message may be used to send the first identifier (e.g., the UE IP address) from the S-GW (the S/P-GW 7 or 8) to the eNodeB 2. This example has an advantage that no modification is needed to the GTP-U signalling message to forward the first identifier.

Second Example

Figure 3:
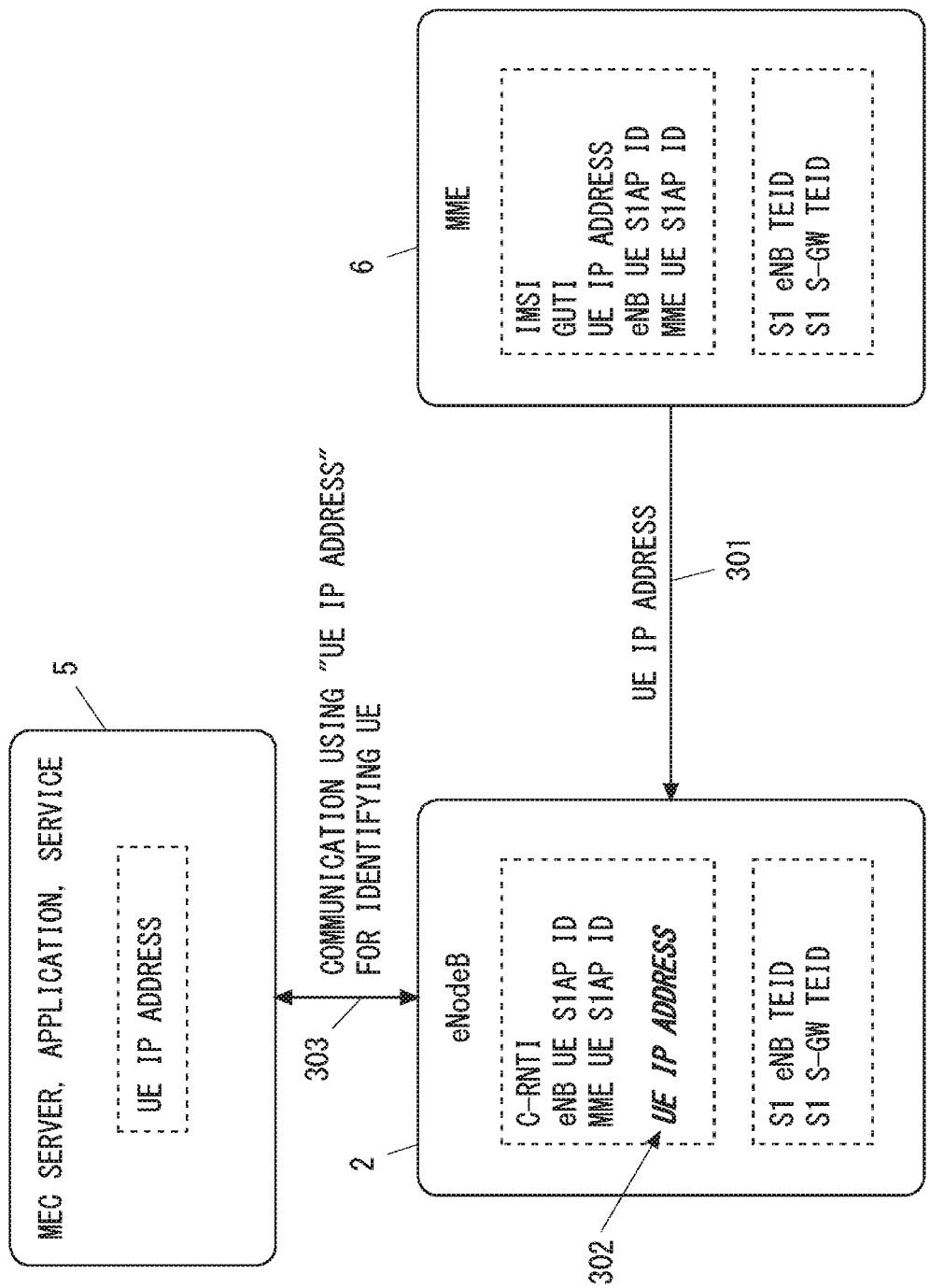
FIG. 3 is a diagram showing one example of operations of an eNodeB, an MEC server, and an MME according to the first embodiment.

FIG. 3 shows one example of operations of the eNodeB 2, the MEC server 5, and the MME 6. In Step 301, the eNodeB 2 receives a first identifier (e.g., a UE IP address) from the MME 6. As described in the first embodiment, the first identifier is used by the MEC server 5 or applications (or services) hosted on the MEC server 5 to identify the UE 1. In some implementations, the eNodeB 2 may receive the first identifier through a signalling interface between the MME 6 and the eNodeB 2 (i.e., an S1-MME interface). The eNodeB 2 may acquire the first identifier from an existing or new information element contained within an S1AP message received from the MME 6. The eNodeB 2 may receive the first identifier from the MME 6 in any procedure that involves signalling with the MME 6 regarding the UE 1, such as an attach procedure or a service request procedure.

In Step 302, the eNodeB 2 associates the first identifier received from the MME 6 with a second identifier that is used by the eNodeB 2 to identify the UE 1. Specific examples of the second identifier are similar to the examples described in the first embodiment.

The eNodeB 2 and the MME 6 use a common identifier (i.e., an eNodeB UE S1AP ID and an MME UE S1AP ID) to identify the UE 1. Accordingly, the eNodeB 2 is able to associate the first identifier (e.g., the UE IP address) of the UE 1 received from the MME 6 with the eNodeB UE S1AP ID and the MME UE S1AP ID of the UE 1. Further, the eNodeB 2 is able to associate the first identifier (e.g., the UE IP address) of the UE 1 with another identifier (e.g., a C-RNTI, an S1 eNB TEID, or an S1 S-GW TEID) based on the eNodeB UE S1AP ID and the MME UE S1AP ID.

Step 303 is similar to Step 203 in FIG. 2.

According to the example shown in FIG. 3, the eNodeB 2 acquires the first identifier that is used by the MEC server 5 or by applications (or services) hosted on the MEC server 5 to identify the UE 1, and associates this first identifier with the second identifier that is used by the eNodeB 2 to identify the UE 1. Similar to the first embodiment, this allows the eNodeB 2 and the MEC server 5 to use a common UE identifier, i.e., the first identifier (e.g., the UE IP address).

Third Example

Figure 4:
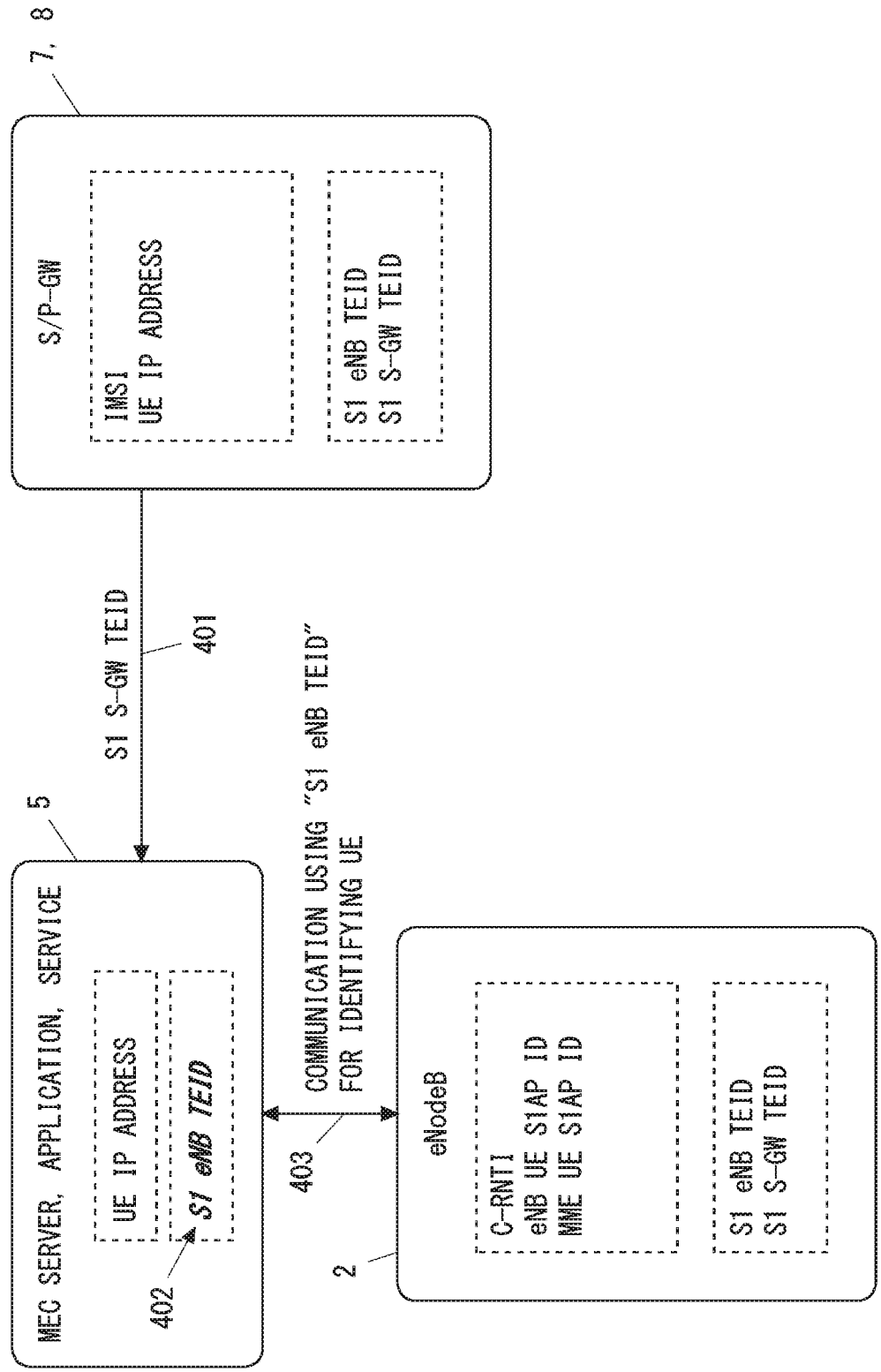
FIG. 4 is a diagram showing one example of operations of an eNodeB, an MEC server, and an S/P-GW according to the first embodiment.

FIG. 4 shows one example of operations of the eNodeB 2, the MEC server 5, and the S/P-GW 7 or 8. The S/P-GW 7 or 8 shown in FIG. 4 means the S-GW alone, the P-GW alone, or both the S-GW and the P-GW. The S/P-GW 7 or 8 may be the S/P-GW 7 arranged in the core network 4 or may be the S/P-GW 8 co-located in the location of the eNodeB 2 along with the MEC server 5. The S/P-GW 8 may be an S/P-GW virtualized on a platform that is the same as or differs from the MEC server 5.

In Step 401, the MEC server 5 receives, from the S/P-GW 7 or 8, a second identifier (e.g., an S1 S-GW TEID or an S1 eNB TEID) that is used by the eNodeB 2 to identify the UE 1. Specific examples of the second identifier are similar to the examples described in the first embodiment. The S/P-GW 7 or 8 manages an S1 eNB TEID and an S1 S-GW TEID to specify an S1 bearer of the UE 1. Accordingly, the second identifier transmitted in Step 401 may include one or both of the S1 S-GW TEID and the S1 eNB TEID. For example, the second identifier transmitted in Step 401 may include only the S1 eNB TEID, or include a combination of the S1 eNB TEID and the S1 S-GW TEID. The second identifier transmitted in Step 401 may include a combination of the S1 S-GW TEID and an S-GW identifier (e.g., an S-GW address).

In some implementations, the MEC server 5 may acquire the second identifier by analyzing a control message (i.e., a GTP for Control plane (GTP-C) message) transmitted from the virtualized S/P-GW 8 to the MME 6 on an S11 interface.

In Step 402, the MEC server 5 associates the second identifier received from the S/P-GW 7 or 8 with a first identifier used by the MEC server 5 or applications (or services) hosted on the MEC server 5 to identify the UE 1. The first identifier is, for example, a UE IP address or an application-layer ID (or name) of the UE 1.

The MEC server 5 and the S/P-GW 7 or 8 use a common identifier (i.e., a UE IP address) to specify the UE 1. In some implementations, the MEC server 5 may acquire the UE IP address of the UE 1 from an MEC application hosted on the MEC server. The MEC server 5 is thus able to associate a second identifier (e.g., an S1 eNB TEID) of the UE 1 received from the S/P-GW 7 or 8 with the UE IP address of the UE 1. Further, the MEC server 5 is able to associate the second identifier of the UE 1 (e.g., the S1 eNB TEID) with another identifier (e.g., an application layer ID of the UE 1) based on the UE IP address.

In Step 403, the MEC server 5 communicates with the eNodeB 2 using the second identifier (e.g., the S1 eNB TEID) to specify the UE 1. In some implementations, the MEC server 5 may transmit a request message containing the second identifier (e.g., the S1 eNB TEID) to the eNodeB 2, thereby requesting the eNodeB 2 to perform special radio resource management for the specific UE 1 identified by the second identifier. In some implementations, the MEC server 5 may notify the eNodeB 2 of delay requirements, throughput requirements, or priority requirements regarding the specific UE 1 identified by the second identifier.

According to the example shown in FIG. 4, the MEC server 5 acquires the second identifier that is used by the eNodeB 2 to identify the UE 1, and associates the second identifier with the first identifier that is used by the MEC server 5 or applications (or services) hosted on the MEC server 5 to identify the UE 1. This allows the eNodeB 2 and the MEC server 5 to use a common UE identifier (i.e., the second identifier). Accordingly, the eNodeB 2 and the MEC server 5 are able to directly exchange therebetween control messages regarding a specific UE 1 by using the second identifier to specify the UE 1.

Further, in some implementations, the configuration in which the S/P-GW 8 notifies the MEC server 5 of the second identifier (e.g., the S1 eNB TEID) has the following advantage over the configuration in which another node (e.g., the MME 6) notifies the MEC server 5 of the second identifier. In order to allow MEC applications hosted on the MEC server 5 installed in the site of the eNodeB 2 to communicate with a UE 1 on the user plane, the P-GW function for terminating an EPS bearer of the UE 1 is preferably arranged in the eNodeB 2. Accordingly, the arrangement in which an S/P-GW is located in the site of the eNodeB 2 along with the MEC server 5 is considered to be the typical arrangement in MEC. Further, as already described above, the configuration in which the MEC server 5 hosts network functions including the virtualized S/P-GW 8 may also be the typical arrangement in MEC. When the above-described circumstances specific to MEC are taken into account, the configuration in which the virtualized S/P-GW 8 co-located with the MEC server 5 supplies the second identifier to the MEC server 5 may be probably achieved easier than the configuration in which the MME 6 in the core network 4 supplies the second identifier to the MEC server 5. This is because the virtualized S/P-GW 8 can be hosted on the MEC server 5 for MEC and also the software of the virtualized S/P-GW 8 can be easily modified. On the other hand, it is assumed that the MME 6 is not dedicated to MEC and is also used for normal cellular communications.

Further, in some implementations, the second identifier sent from the S/P-GW 7 or 8 to the MEC server 5 may be an identifier that is not changed when an inter-eNB handover is performed. This allows the MEC server 5 to avoid frequent updates of the second identifier. The second identifier may be, for example, the S1 S-GW TEID or a combination of the S1 S-GW TEID and the S-GW identifier (e.g., the S-GW address). Unless the S-GW is changed after the inter-eNB handover, each of the S1 S-GW TEID and the S-GW identifier is the same before and after the inter-eNB handover.

Fourth Example

Figure 5:
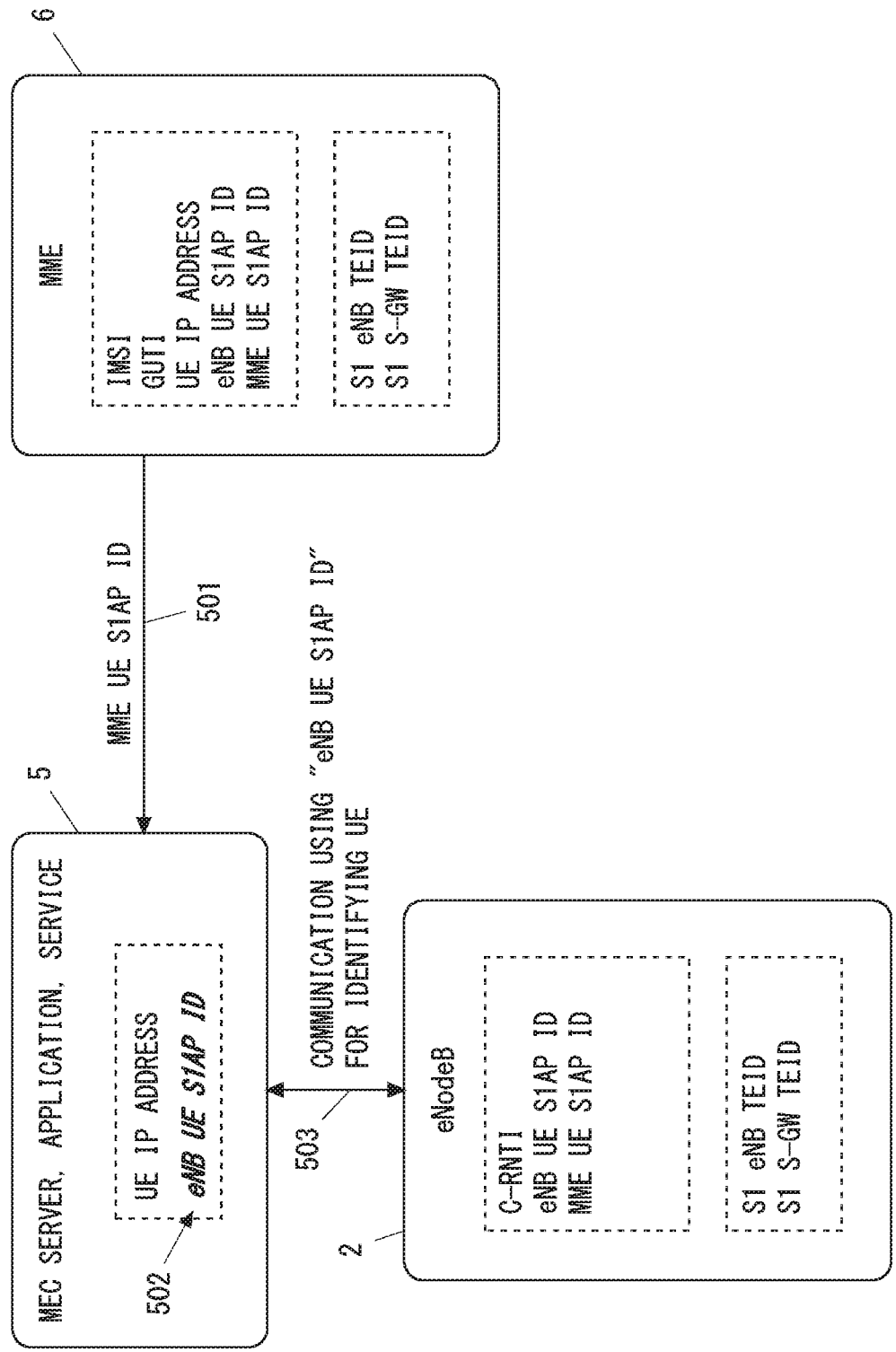
FIG. 5 is a diagram showing one example of operations of an eNodeB, an MEC server, and an MME according to the first embodiment.

FIG. 5 shows one example of operations of the eNodeB 2, the MEC server 5, and the MME 6. In Step 501, the MEC server 5 receives from the MME 6 a second identifier (e.g., an MME UE S1AP ID or an eNB UE S1AP ID) that is used by the eNodeB 2 to identify the UE 1. Specific examples of the second identifier are similar to the examples described in the first embodiment. The MME 6 manages an eNodeB UE S1AP ID, an MME UE S1AP ID, an S1 eNB TEID, and an S1 S-GW TEID for the UE 1. These identifiers are managed for the UE 1 also in the eNodeB 2. Accordingly, the second identifier transmitted in Step 501 may include any combination of the eNodeB UE S1AP ID, the MME UE S1AP ID, the S1 eNB TEID, and the S1 S-GW TEID. For example, the second identifier transmitted in Step 501 may include one or both of the eNodeB UE S1AP ID and the S1 eNB TEID. The second identifier transmitted in Step 501 may include a combination of the eNodeB UE S1AP ID and the MME UE S1AP ID. The second identifier transmitted in Step 501 may include a combination of the MME UE S1AP ID and an identifier of the MME (e.g., an MMEC, an MMEI, or a GUMMEI). The second identifier transmitted in Step 501 may include a combination of the S1 eNB TEID and the S1 S-GW TEID. The second identifier transmitted in Step 4501 may include a combination of the S1 S-GW TEID and an identifier of the S-GW (e.g., an S-GW address).

Step 502 is similar to Step 402 in FIG. 4. That is, in Step 502, the MEC server 5 associates the second identifier received from the MME 6 with a first identifier that is used by the MEC server 5 or applications (or services) hosted on the MEC server 5 to identify the UE 1. The first identifier is, for example, a UE IP address or an application-layer ID (or name) of the UE 1.

Step 503 is similar to Step 403 in FIG. 4. That is, the MEC server 5 communicates with the eNodeB 2 using the second identifier (e.g., the eNB UE S1AP ID) to specify the UE 1.

In the example shown in FIG. 5, the MEC server 5 acquires the second identifier that is used by the eNodeB 2 to identify the UE 1, and associates this second identifier with the first identifier that is used by the MEC server 5 or by applications (or services) hosted on the MEC server 5 to identify the UE 1. Accordingly, similar to the third embodiment, the eNodeB 2 and the MEC server 5 are able to use a common UE identifier, i.e., the second identifier (e.g., the eNB UE S1AP ID).

Further, in some implementations, the second identifier sent from the MME 6 to the MEC server 5 may be an identifier that is not changed when an inter-eNB handover is performed. This allows the MEC server 5 to avoid frequent updates of the second identifier. The second identifier may be, for example, the MME UE S1AP ID, or a combination of the MME UE S1AP ID and the MME identifier (e.g., the MMEC, the MMEI, or the GUMMEI). Unless the MME is changed after the inter-eNB handover, each of the MME UE S1AP ID and the MME identifier is the same before and after the inter-eNB handover.

Fifth Example

Figure 6:
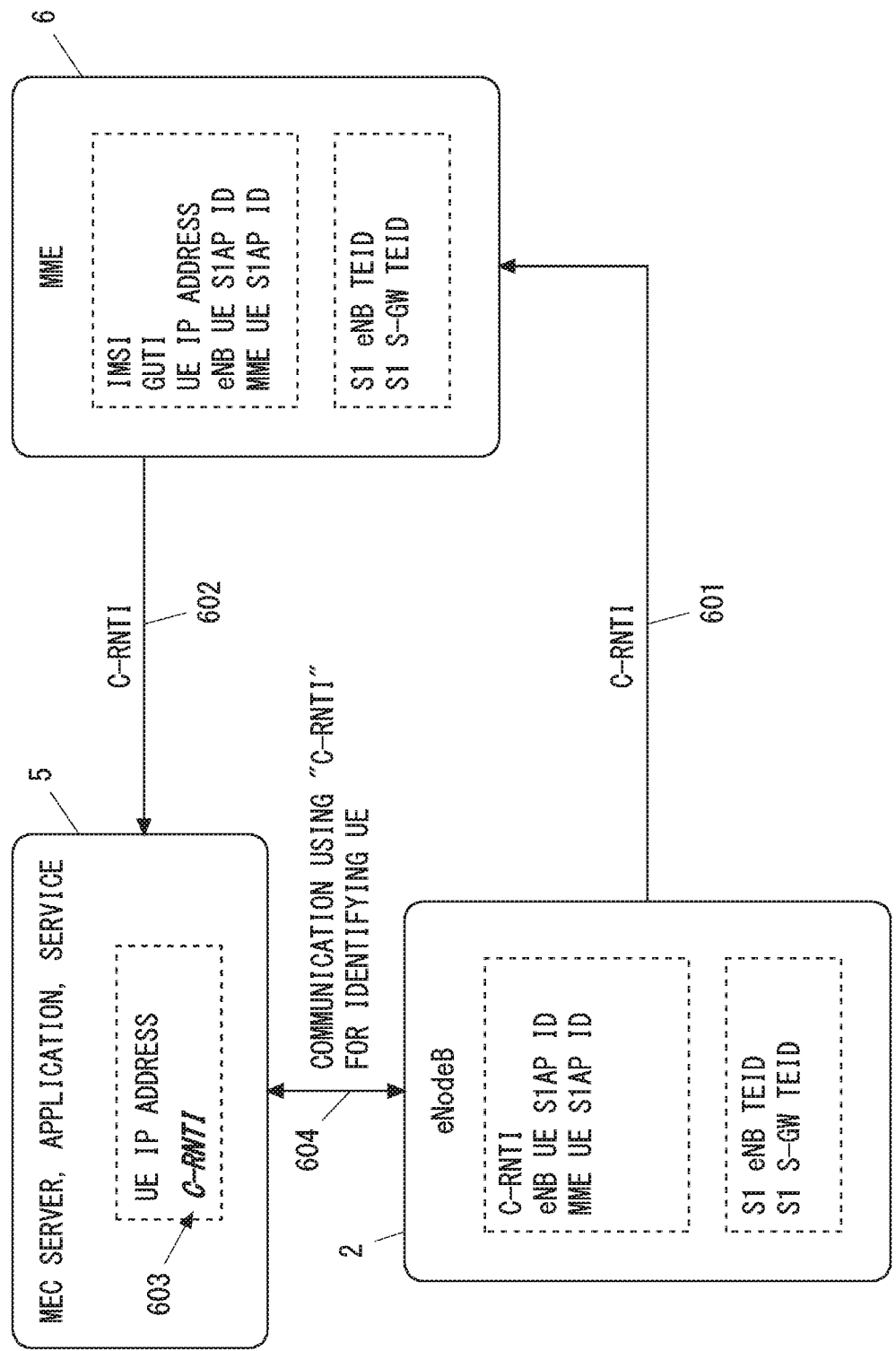
FIG. 6 is a diagram showing one example of operations of an eNodeB, an MEC server, and an MME according to the first embodiment.

FIG. 6 shows one example of operations of the eNodeB 2, the MEC server 5, and the MME 6. In the example shown in FIG. 6, the eNodeB 2 sends to the MEC server 5, via the MME 6, a C-RNTI that is used by the eNodeB 2 to identify the UE 1. In other words, in the example shown in FIG. 6, the C-RNTI is used as the second identifier.

In Step 601, the eNodeB 2 transmits to the MME 6 the C-RNTI used by the eNodeB 2 to identify the UE 1. In some implementations, the eNodeB 2 may include the C-RNTI of the UE 1 into an S1AP message transmitted to the MME 6 on an S1-MME interface for the UE 1 (e.g., S1AP Initial UE message, S1AP Path Switch Request, S1AP Handover Request Acknowledge, or S1AP Handover Notify).

The eNodeB 2 and the MME 6 use a common identifier (i.e., an eNodeB UE S1AP ID and an MME UE S1AP ID) to specify the UE 1. Accordingly, the MME 6 is able to associate the C-RNTI received from the eNodeB 2 with the eNodeB UE S1AP ID and the MME UE S1AP ID of this UE 1. Further, the MME 6 is able to associate the C-RNTI of the UE 1 with a UE IP address of the UE 1 based on the eNodeB UE S1AP ID and the MME UE S1AP ID.

In Step 602, the MEC server 5 receives from the MME 6 the C-RNTI that is used by the eNodeB 2 to identify the UE 1. Step 603 is similar to Step 502 shown in FIG. 5. However, in FIG. 6, the C-RNTI is used as the second identifier, and the MEC server 5 associates the C-RNTI received from the MME 6 with a first identifier that is used by the MEC server 5 or applications (or services) hosted on the MEC server 5 to identify the UE 1. The first identifier is, for example, a UE IP address or an application-layer ID (or name) of the UE 1. Step 604 is similar to Step 503 in FIG. 5. However, the MEC server 5 communicates with the eNodeB 2 using the C-RNTI to specify the UE 1.

The eNodeB 2 uses the C-RNTI to identify the UE 1 in the radio resource management (e.g., scheduling) in the access stratum (AS) and in the RRC connection with the UE 1. Thus, in the example shown in FIG. 6, when the MEC server 5 requests the eNodeB 2 to perform special radio resource management for a specific UE 1, the MEC server 5 can communicate with the eNodeB 2 using the UE identifier in accordance with the radio resource management in the eNodeB 2.

Sixth Example

In some implementations, to allow the eNodeB 2 and the MEC server 5 to use a common UE identifier, another control node such as an NFV controller 700 may be used. The other control node (e.g., the NFV controller 700) may mediate the communication between the eNodeB 2 and the MEC server 5.

Figure 7:
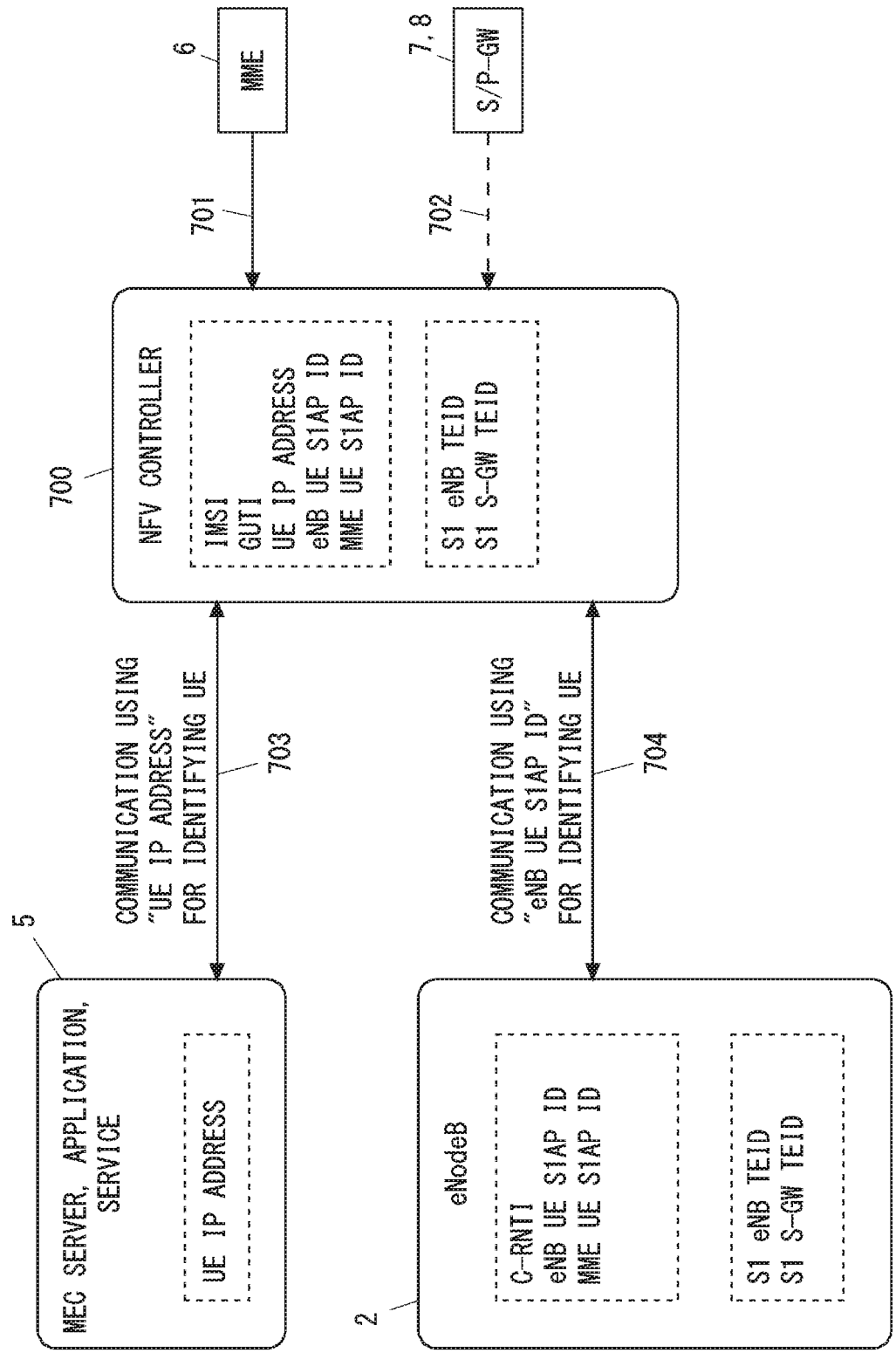
FIG. 7 is a diagram showing one example of operations of an eNodeB, an MEC server, and an NFV controller according to the first embodiment.

FIG. 7 shows one example of operations of the eNodeB 2, the MEC server 5, and the NFV controller 700. In Step 701, the NFV controller 700 receives various identifiers of the UE 1 from the MME 6. Further or alternatively, the NFV controller 700 may receive various identifiers of the UE 1 from the S/P-GW 7 or 8 (Step 702). These various identifiers include the above-described first identifier (e.g., a UE IP address) and the second identifier (e.g., an eNB UE S1AP ID).

In Steps 703 and 704, the NFV controller 700 mediates the communication between the eNodeB 2 and the MEC server 5 that use different UE identifiers. For example, in response to receiving a message containing the first identifier (e.g., the UE IP address) from the MEC server 5, the NFV controller 700 replaces the first identifier in this message with the second identifier (e.g., the eNB UE S1AP ID), and transmits a message containing the second identifier to the eNodeB 2. Further or alternatively, in response to receiving a message containing the second identifier from the eNodeB 2, the NFV controller 700 replaces the second identifier in this message with the first identifier, and transmits a message containing the first identifier to the MEC server 5.

According to the example shown in FIG. 7, by using the mediation of the NFV controller 700, the eNodeB 2 and the MEC server 5 are able to exchange control messages regarding a specific UE 1.

Figure 8:
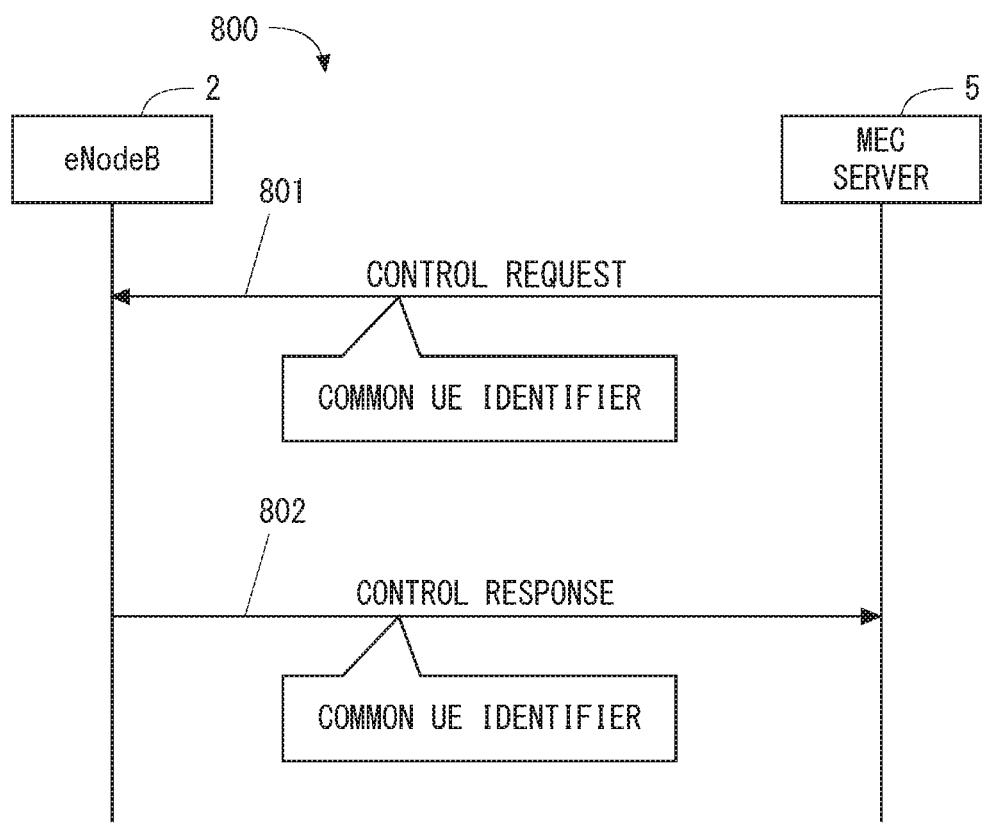
FIG. 8 is a sequence diagram showing one example of operations of an eNodeB and an MEC server according to the first embodiment.

Next, some example of communication between the eNodeB 2 and the MEC server 5 using a common UE identifier are described. FIG. 8 is a sequence diagram showing one example of operations (Process 800) of the eNodeB 2 and the MEC server 5. In Step 801, the MEC server 5 transmits, to the eNodeB 2, a control request message containing a common UE identifier to identify a specific UE 1. When the procedure described in the first or second example is used, the common UE identifier is the first identifier (e.g., the UE IP address). On the other hand, when the procedure described in the third, fourth, or fifth example is used, the common UE identifier is the second identifier (e.g., the S1 S-GW TEID, the S1 eNB TEID, the MME UE S1AP ID, the eNB UE S1AP ID, or the C-RNTI).

In some implementations, the control request message transmitted in Step 801 may request that the eNodeB 2 perform special radio resource management for the specific UE 1. For example, the radio resource management includes: establishment, modification, and release of a radio connection (e.g., RRC connection) with the UE 1; scheduling of radio resources for the UE 1; configuration of dedicated scheduling request (D-SR) resources for the UE 1; and controlling of a handover of the UE 1. In some implementations, the MEC server 5 may notify the eNodeB 2 of delay requirements, throughput requirements, or priority requirements regarding the specific UE 1.

In Step 802, the eNodeB 2 transmits to the MEC server 5 a control response message in response to the request transmitted in Step 801. The control response message contains the common UE identifier to identify a specific UE 1. In some implementations, the control response message may indicate the result of the requested control (e.g., success or failure).

Figure 9:
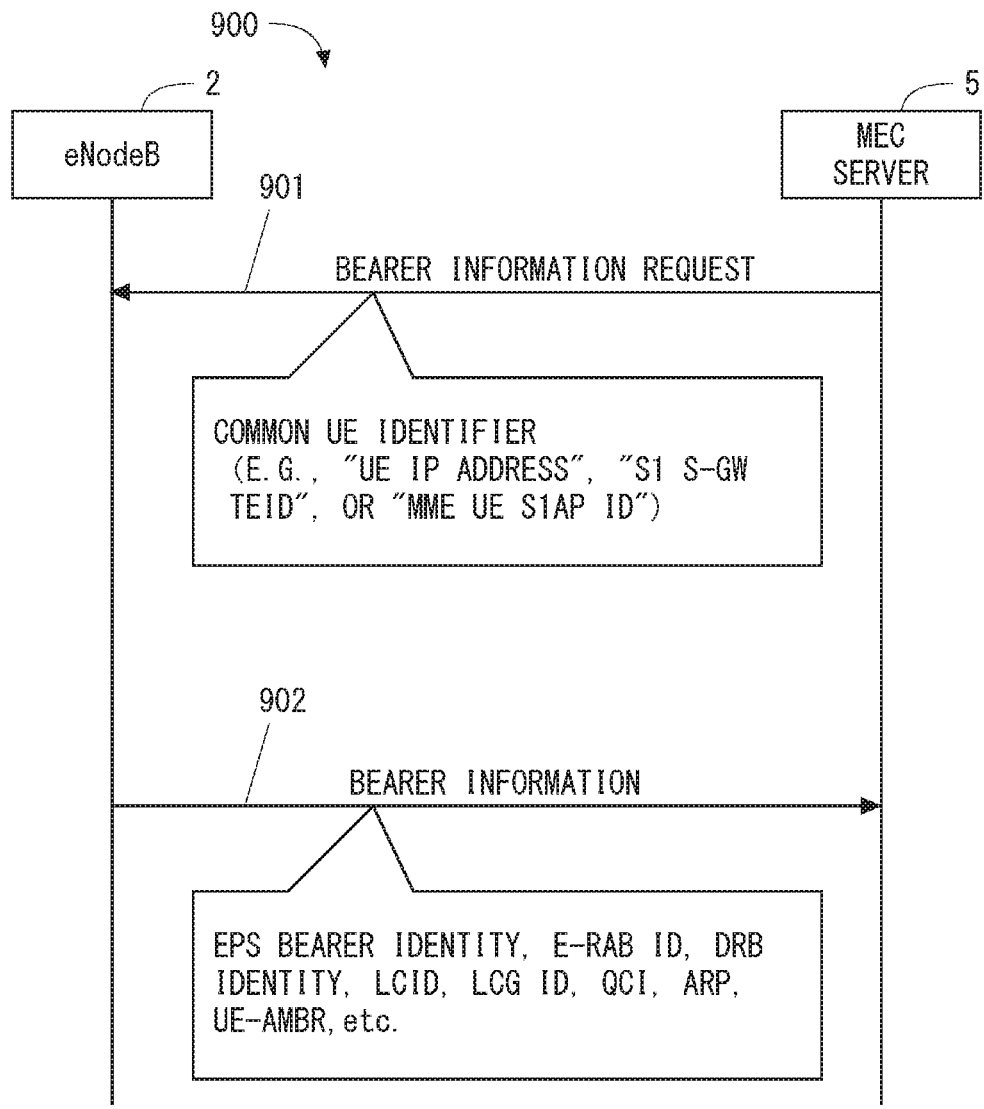
FIG. 9 is a sequence diagram showing one example of operations of an eNodeB and an MEC server according to the first embodiment.

FIG. 9 is a sequence diagram showing another example of operations (Process 900) of the eNodeB 2 and the MEC server 5. In the example shown in FIG. 9, the MEC server 5 communicates with the eNodeB 2 using a common UE identifier to identify a specific UE 1 and acquires, from the eNodeB 2, information regarding a radio bearer or logical channel configured for the specific UE 1. By using the acquired information regarding the radio bearer or the logical channel, the MEC server 5 is able to easily send to the eNodeB 2 a control request about the specific UE 1 on a per-radio-bearer basis or a per-logical-channel basis.

In Step 901, the MEC server 5 transmits a bearer information request message containing the common UE identifier to identify the specific UE 1 to the eNodeB 2. When the procedure described in the first or second embodiment is used, the common UE identifier is the first identifier (e.g., the UE IP address). On the other hand, when the procedure described in the third, fourth, or fifth embodiment is used, the common UE identifier is the second identifier (e.g., the S1 S-GW TEID, the S1 eNB TEID, the MME UE S1AP ID, the eNB UE S1AP ID, or the C-RNTI).

In Step 902, the eNodeB 2 transmits bearer information regarding the specific UE 1 to the MEC server 5 in response to the request transmitted in Step 901. This bearer information may include, for example, an identifier of a radio bearer or a logical channel configured for the specific UE 1. In some implementations, the identifier of the radio bearer or the logical channel includes at least one of an EPS Bearer Identity, an E-UTRAN Radio Access Bearer (E-RAB) ID, a Data Radio Bearer (DRB) Identity, a Logical Channel Identity (LCID), and a Logical Channel Group (LCG) ID. Further or alternatively, this bearer information may include a Quality of Service (QoS) parameter regarding the radio bearer or the logical channel configured for the specific UE 1. This QoS parameter is taken into account in the radio resource scheduling performed by the eNodeB 2. In some implementations, this QoS parameter includes at least one of a QoS Class Identifier (QCI), an Allocation and Retention Priority (ARP), a Guaranteed Bit rate (GBR) for GBR type EPS bearer, and a UE Aggregate Maximum Bit Rate (UE-AMBR) for non-GBR type EPS bearer.

Second Embodiment

In this embodiment, the fourth example (FIG. 5) and the fifth example (FIG. 6) described above are described in further detail. A configuration example of a mobile communication network according to this embodiment is similar to that shown in FIG. 1A.

Figure 10:
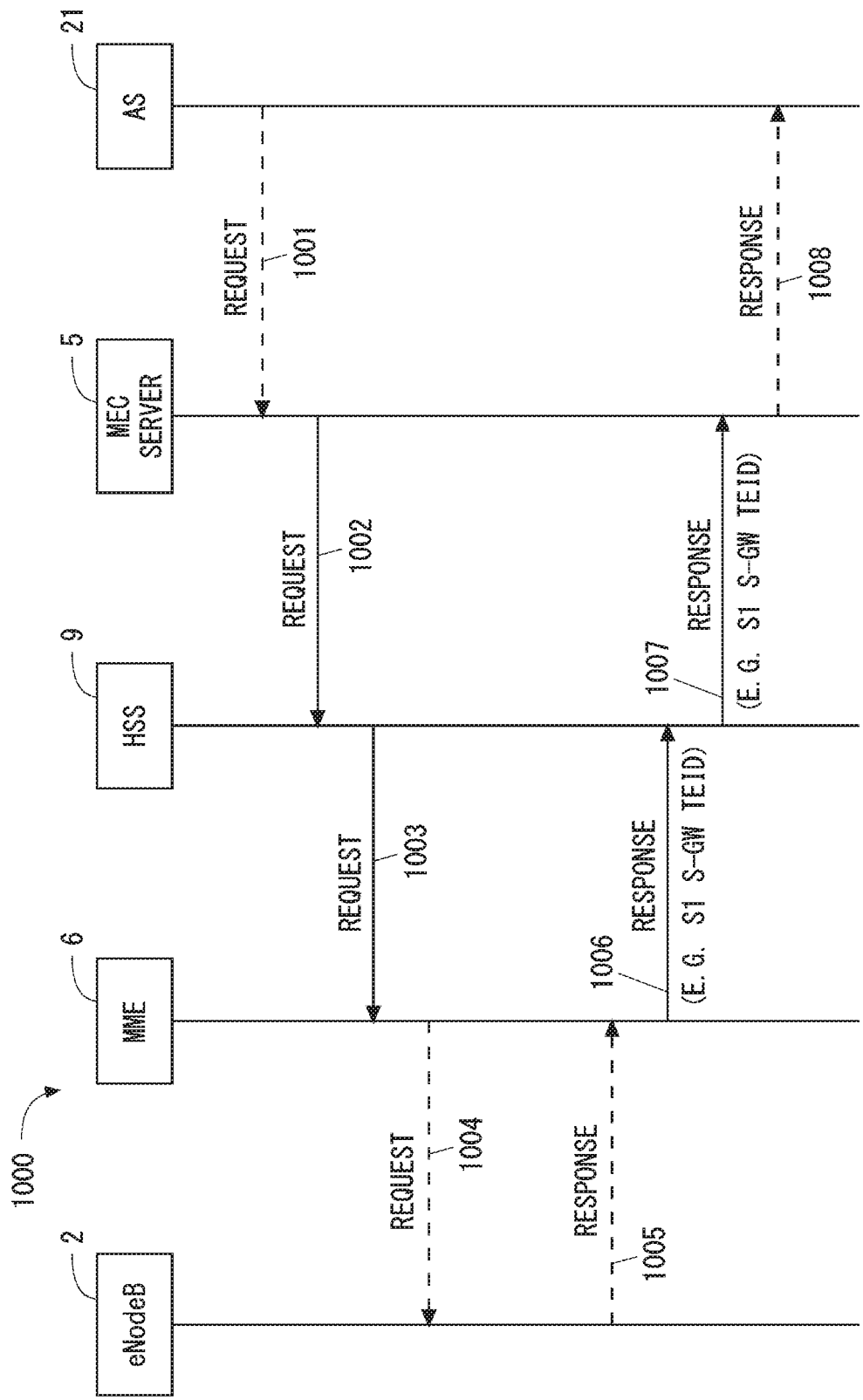
FIG. 10 is a sequence diagram showing one example of operations of an eNodeB, an MME, an HSS, and an MEC server according to a second embodiment.

FIG. 10 shows one example of operations (Process 1000) of the eNodeB, the MME, the HSS and the MEC server. In Step 1002, the MEC server 5 (e.g., SCEF) sends, to the HSS 9, a request message in order to configure at least one of the MME 6 and the HSS 9 to report a second identifier to be used by the eNodeB 2 for identifying the UE 1. The MEC server 5 may send the request message in Step 1002 in response to a control request (Step 1001) from the application server 21. The request message in Step 1002 contains an external identifier (e.g., IP address) or Mobile Station International Subscriber Directory Number (MSISDN) for specifying the UE 1. The HSS 9 examines the request message received from the MEC server 5, specifies the MME 6 that manages the UE 1 indicated by the request message, and sends a request message to the specified MME 6 (Step 1003). The request message in Step 1003 may contain International Mobile Subscriber Identity (IMSI) of the UE 1 to specify the UE 1, and may also contain an identifier (e.g., IP address, SCEF ID, SCEF Reference ID) of the MEC server 5.

In response to the request message (Step 1003) from the HSS 9, the MME 6 sends, to the HSS 9, a response message (Step 1006) containing the second identifier (e.g., S1 S-GW TEID) to be used by the eNodeB 2 for identifying the UE 1. Note that, when a C-RNTI is used as the second identifier, the MME 6 may send a request message (Step 1004) to the eNodeB 2 to acquire the C-RNTI of the UE 1, and receive from the eNodeB 2 a response message (Step 1005) containing the C-RNTI of the UE 1.

The HSS 9 sends, to the MEC server 5, a response message (Step 1007) containing the second identifier (e.g., S1 S-GW TEID). The MEC server 5 may send, to the application server 21, a response message (Step 1008) indicating completion of preparation (or configuration) for controlling a network on the basis of the control request (Step 1001).

The procedure shown in FIG. 10 may be modified as follows. The MEC server 5 may send the request message (Step 1002) to the MEC server 5 directly without going through the HSS 9. The MME 6 may send the response message (Step 1006) to the MEC server 5 directly without going through the HSS 9.

According to the example shown in FIG. 10, the MEC server 5 can acquire, from the MME 6, the second identifier to be used by the eNodeB 2 for identifying the UE 1, and associate this second identifier with the first identifier to be used by the MEC server 5 or applications (or services) hosted on the MEC server 5 for identifying the UE 1. Thus, the eNodeB 2 and the MEC server 5 can use the common UE identifier, which is the second identifier (e.g., S1 S-GW TEID).

Third Embodiment

In this embodiment, a procedure to notify the MEC server 5 of a change (or update) in a second identifier (e.g., S1 S-GW TEID, MME UE S1AP ID, or C-RNTI) to be used as the common UE identifier is described.

Figure 11:
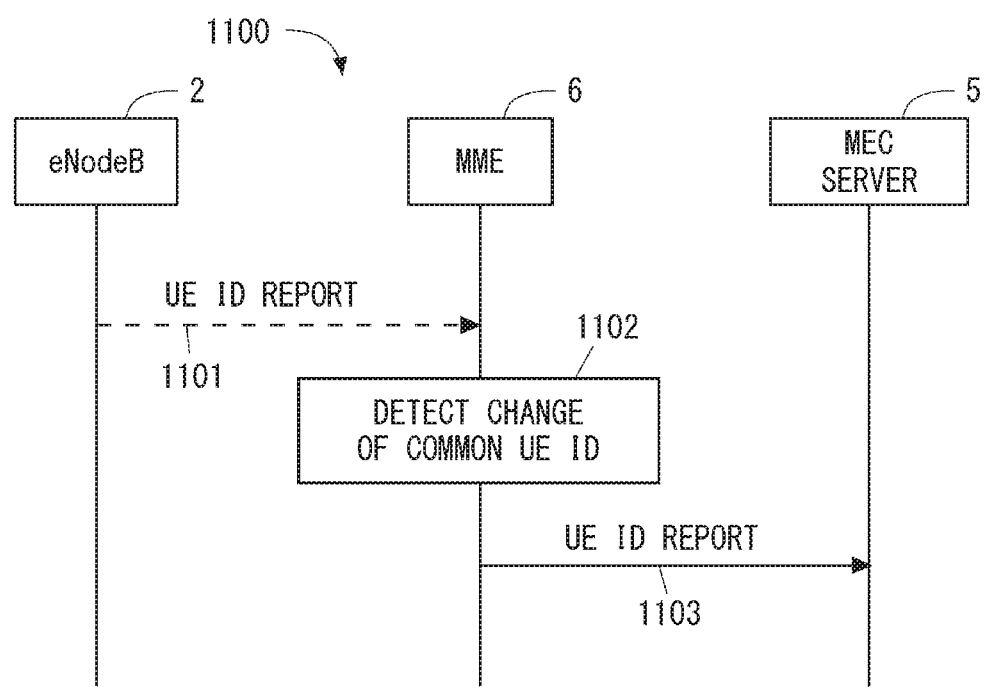
FIG. 11 is a sequence diagram showing one example of operations of an eNodeB, an MME, and an MEC server according to a third embodiment.

FIG. 11 shows one example of operations (Process 1100) of the eNodeB 2, the MME 6, and the MEC server 5. In Step 1102, the MME 6 detects a change in a second identifier (e.g., S1 S-GW TEID, MME UE S1AP ID, or C-RNTI) to be used as the common UE identifier between the eNodeB 2 and the MEC server 5. The second identifier may be changed by the eNodeB 2. In Step 1103, the MME 6 sends, to the MEC server 5, a UE ID report indicating the changed (or updated) second identifier. When a C-RNTI is used as the second identifier, the MME 6 may receive a UE ID report indicating a change in the C-RNTI from the eNodeB 2. The eNodeB 2 may send a UE ID report indicating a change in the second identifier directly to the MEC server 5.

The MME 6 may detect a change in the second identifier during a procedure related to an event that causes a change in the second identifier. When a C-RNTI, an S1 eNB TEID, or an eNB UE S1AP ID is used as the second identifier, the second identifier is changed due to a state transition of the UE 1 between a connected mode (i.e., RRC_CONNECTED mode) and an idle mode (i.e., RRC_IDLE mode), and is further changed due to inter-eNB handover of the UE 1. When an MME UE S1AP ID is used as the second identifier, the second identifier is updated due to idle mode mobility and connected mode mobility (i.e., handover) of the UE 1 involving MME change (or relocation) or S-GW change (or relocation). When an S1 SGW TEID is used as the second identifier, the second identifier is updated due to idle mode mobility and connected mode mobility (i.e., handover) of the UE 1 involving S-GW change (or relocation). The idle mode mobility includes Tracking Area Update (TAU). The connected mode mobility includes handover.

The MME 6 may notify the MEC server 5 of a change in the second identifier through the HSS 9. The MME 6 may be configured to, each time a change in the second identifier occurs, report this to the MEC server 5 on a continuous basis. For example, the request message in Step 1002 of FIG. 10 may cause the HSS 9 to continuously report a change in the second identifier. Further or alternatively, the request message in Step 1003 of FIG. 10 may cause the MME 6 to continuously report a change in the second identifier. The MEC server 5 can thereby receive an updated value of the second identifier from the MME 6 directly or through the HSS 9 each time the second identifier as the common UE identifier is changed.

Fourth Embodiment

In this embodiment, a procedure to notify the MEC server 5 of an occurrence of a state transition of the UE 1 between a connected mode (i.e., RRC_CONNECTED or ECM-CONNECTED) and an idle mode (i.e., RRC_IDLE or ECM-IDLE) is described.

Figure 12:
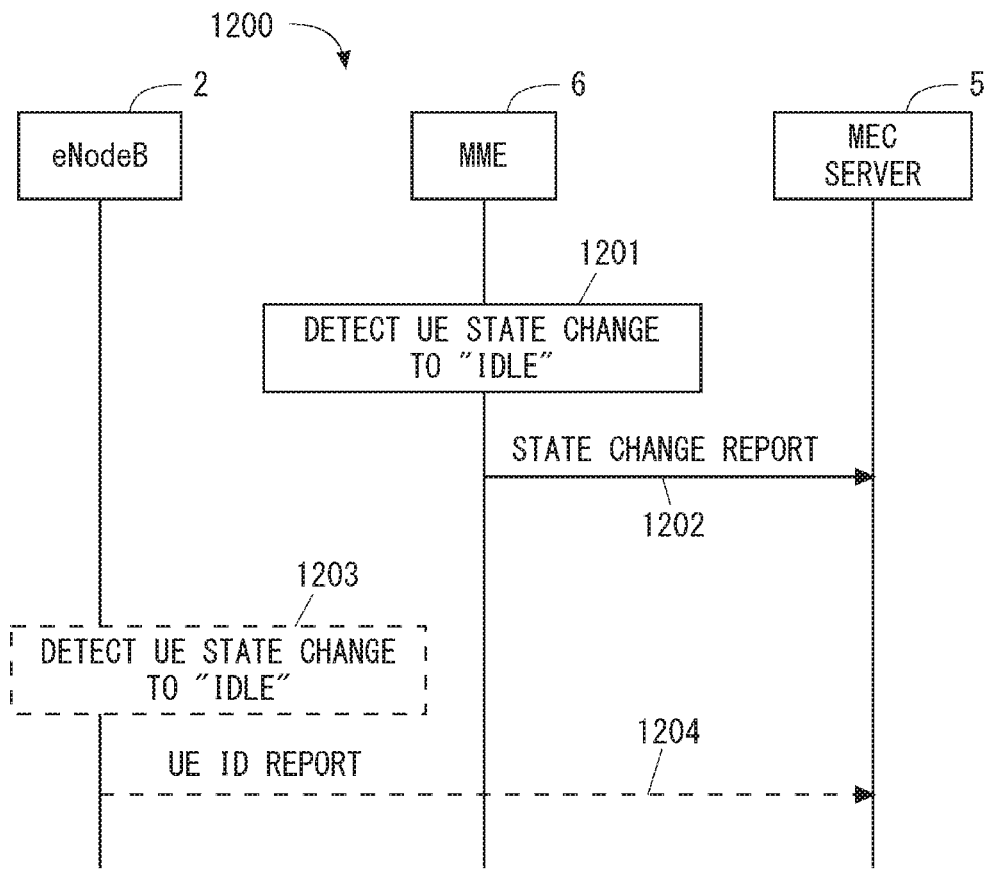
FIG. 12 is a sequence diagram showing one example of operations of an eNodeB, an MME, and an MEC server according to a fourth embodiment.

FIG. 12 shows one example of operations (Process 1200) of the eNodeB 2, the MME 6, and the MEC server 5. In Step 1201, the MME 6 detects that the UE 1 transitions (or has transitioned) to the idle mode. In response thereto, in Step 1202, the MME 6 sends to the MEC server 5 a state change report indicating that the UE 1 transitions (or has transitioned) to the idle mode. Instead of the MME 6, the eNodeB 2 may detect that the UE 1 transitions (or has transitioned) to the idle mode (Step 1203), and send to the MEC server 5 a state change report indicating that the UE 1 transitions (or has transitioned) to the idle mode (Step 1204).

When an IP address, an MME UE S1AP ID, or an S1 S-GW TEID is used as the common UE identifier, in response to the transition of the UE 1 to connected mode, the MME 6 or the eNodeB 2 may send to the MEC server 5 a state change report indicating that the UE 1 has transitioned to the connected mode.

When a C-RNTI, an S1 eNB TEID, or an eNB UE S1AP ID is used as the common UE identifier, the MME 6 or the eNodeB 2 may send to the MEC server 5 a state change report indicating that the UE 1 has transitioned to connected mode along with a UE ID report indicating a change in the common UE identifier.

The state change report may be sent along with an ID of the sender MME or eNB and an identifier (e.g., IP address, SCEF ID, SCEF Reference ID) of the destination MEC server 5.

According to the operations described in this embodiment, the MEC server 5 can recognize the state change in the UE 1.

Fifth Embodiment

In this embodiment, a procedure to notify the MEC server 5 of a change of an MME caused by idle mode mobility of the UE 1 is described.

Figure 13:
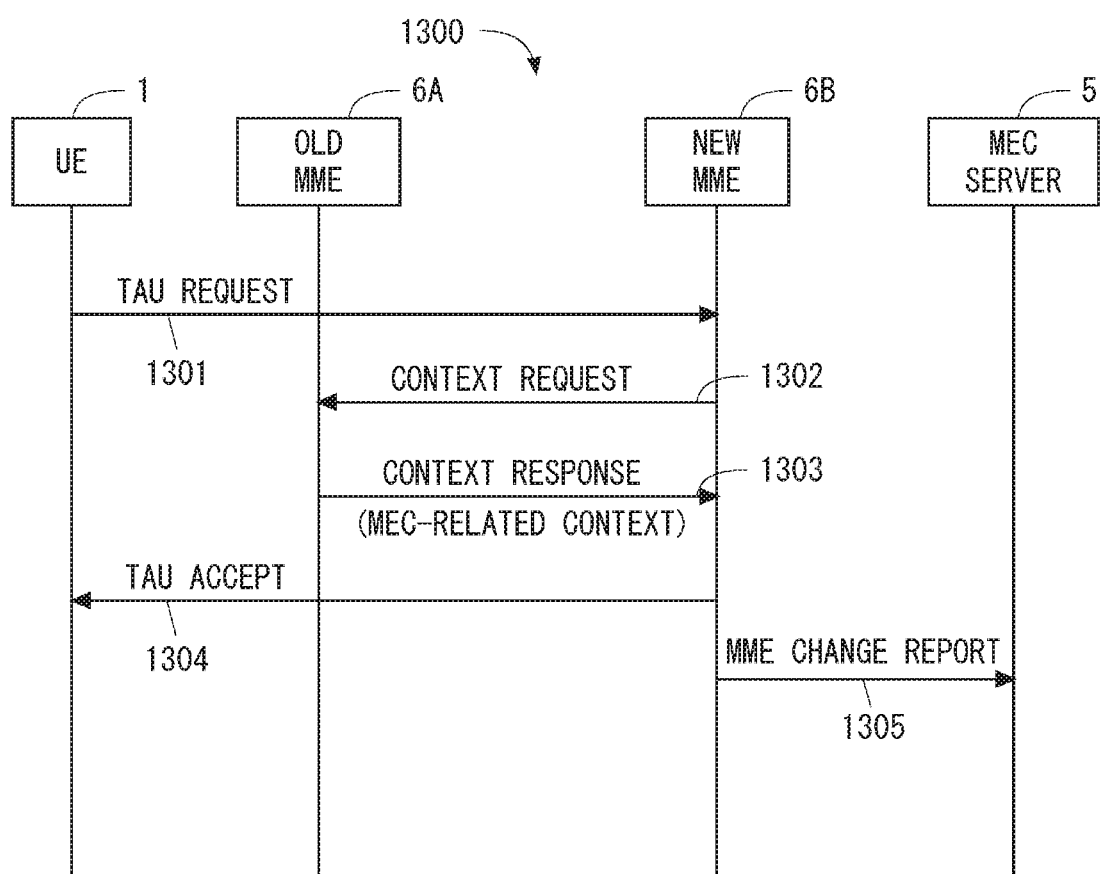
FIG. 13 is a sequence diagram showing one example of operations of an eNodeB, an MME, and an MEC server according to a fifth embodiment.

FIG. 13 shows one example of operations (Process 1300) of the eNodeB 2, an (old) MME 6A, a (new) MME 6B, and the MEC server 5 in a TAU procedure involving an MME change. In Step 1301, the UE 1 sends a TAU request message. This TAU request message is sent to the new MME 6B based on MME selection of the eNodeB 2, which is not shown. In Step 1302, the new MME 6B derives the old MME 6A from the received TAU request message, and sends a context request message to the old MME 6A. In Step 1303, in response to the context request message, the old MME 6A sends a context response message to the new MME 6B. This context response message contains an MEC-related context. The MEC-related context may contain an identifier (e.g., IP address, SCEF ID, SCEF Reference ID) of the MEC server 5. The new MME 6B can communicate with the MEC server 5 on the basis of the received MEC-related context. In Step 1304, the new MME 6B sends a TAU accept message to the UE 1. Note that, in FIG. 13, the other operations (e.g., interaction between the MME 6 and the HSS 9) performed in the normal TAU procedure are omitted.

In Step 1305, the new MME 6B sends to the MEC server 5 an MME change report indicating that the MME providing the mobility management of the UE 1 has been changed. The MME change report indicates the address of the updated MME 6 (i.e., the address of the new MME 6B). When the common UE identifier is an MME UE S1AP ID, it changes due to a TAU involving a MME change. Further, when the common UE identifier is an S1 S-GW TEID, it changes due to a TAU involving an S-GW change. Accordingly, the new MME 6B may send to the MEC server 5 a UE ID report indicating the changed (or updated) MME UE S1AP ID or S1 S-GW TEID along with the MME change report.

According to the operations described in this embodiment, the MEC server 5 can recognize a change of the MME providing the mobility management of the UE 1.

Sixth Embodiment

In this embodiment, a procedure to notify the MEC server 5 of a change of an eNB caused by connected mode mobility (i.e., handover) of the UE 1 is described.

Figure 14:
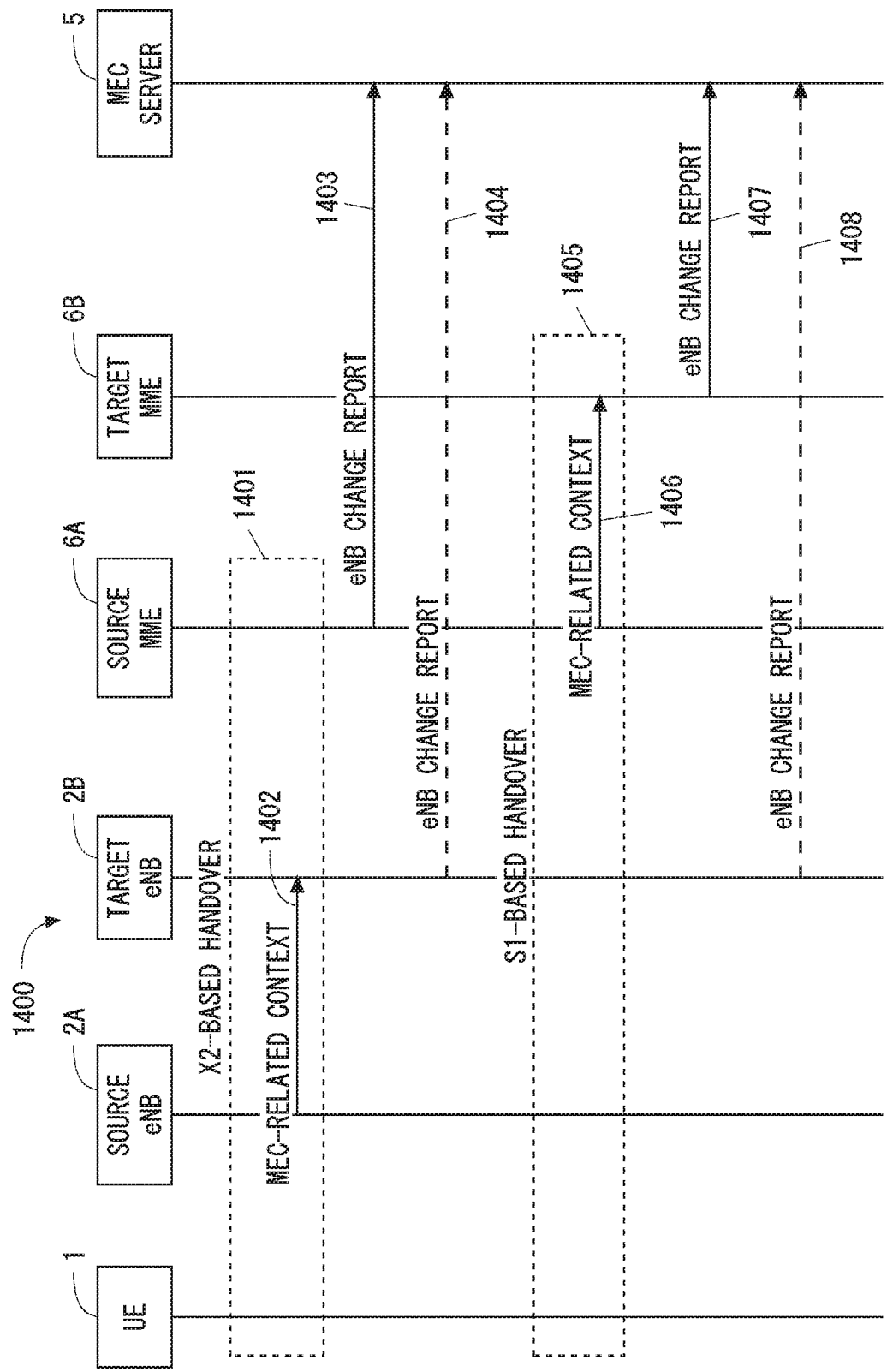
FIG. 14 is a sequence diagram showing one example of operations of an eNodeB, an MME, and an MEC server according to a sixth embodiment.

FIG. 14 shows one example of operations (Process 1400) of a source eNodeB 2A, a target eNodeB 2B, a source MME 6A, a target MME 6B, and the MEC server 5 in the X2-based handover procedure and the S1-based handover procedure. Steps 1401 to 1404 are operations related to the X2-based handover procedure. The X2-based handover procedure does not involve a MME change. In Step 1401, the UE 1, the source eNodeB 2A, the target eNodeB 2B and the MME 6A carry out the X2-based handover procedure. The source eNodeB 2A sends a MEC-related context to the target eNodeB 2B (Step 1402). The MEC-related context may contain an identifier (e.g., IP address, SCEF ID, SCEF Reference ID) of the MEC server 5. When the first identifier (e.g., UE IP address) of the UE 1 is used as the common UE identifier, the MEC-related context may further contain the first identifier (e.g., UE IP address) of the UE 1. The target eNodeB 2B can communicate with the MEC server 5 on the basis of the received MEC-related context.

In Step 1403, the MME 6A sends to the MEC server 5 an eNB change report indicating that the eNodeB to which the UE 1 is connected has been changed. Alternatively, the target eNodeB 2B may send the eNB change report to the MEC server 5 (Step 1404). The eNB change report indicates the address of the updated eNodeB 2 (i.e., the address of the target eNodeB 2B).

Steps 1405 to 1408 show operations related to the S1-based handover procedure. The S1-based handover procedure involves a MME change. In Step 1405, the UE 1, the source eNodeB 2A, the target eNodeB 2B, the source MME 6A and the target MME 6B carry out the S1-based handover procedure. The source MME 6A sends a MEC-related context to the target MME 6B (Step 1406). The target MME 6B can communicate with the MEC server 5 on the basis of the received MEC-related context. In Step 1407, the target MME 6B sends to the MEC server 5 an eNB change report indicating that the eNodeB to which the UE 1 is connected has been changed. Alternatively, the target eNodeB 2B may send the eNB change report to the MEC server 5 (Step 1408).

Figure 15:
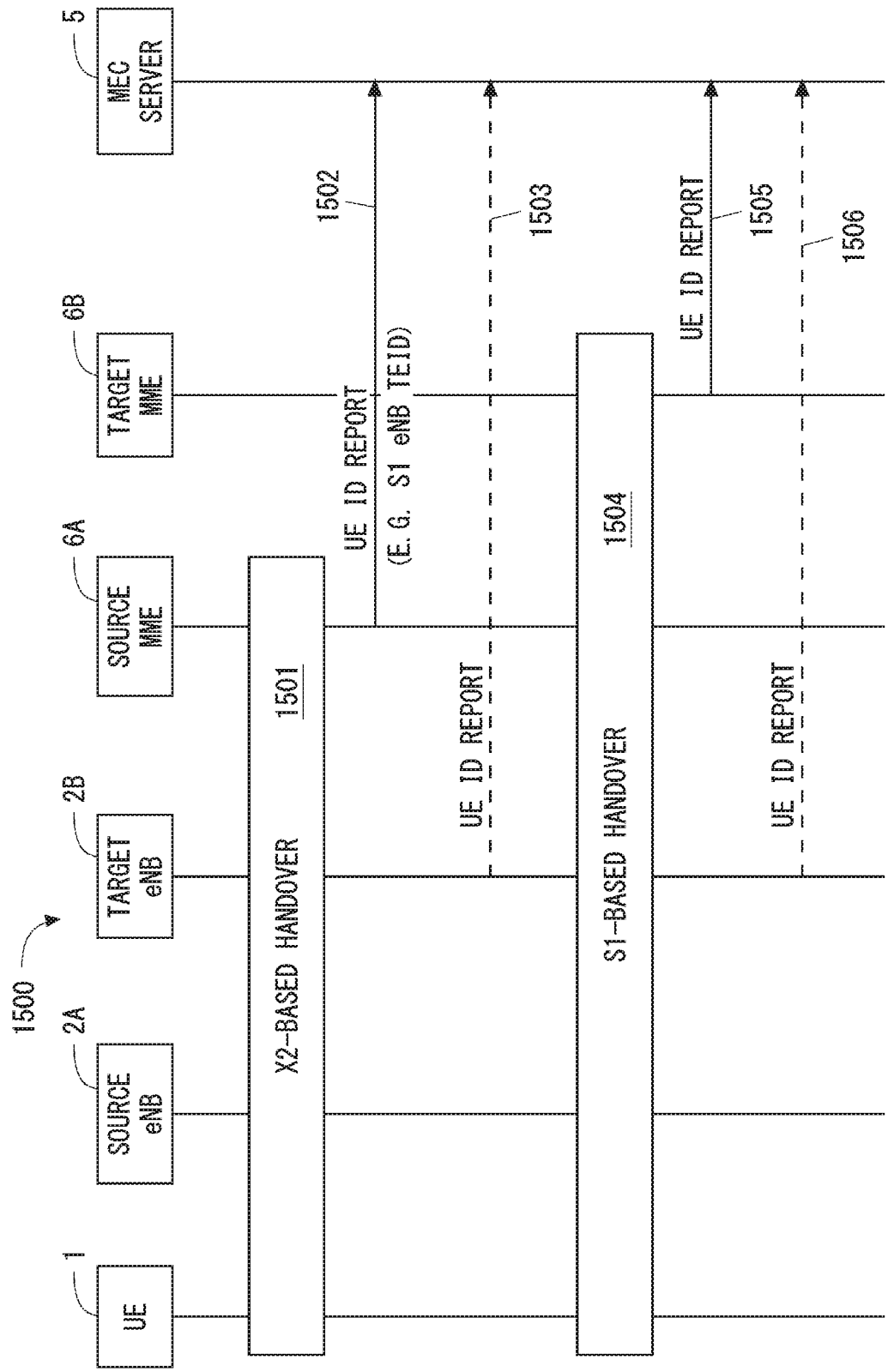
FIG. 15 is a sequence diagram showing one example of operations of an eNodeB, an MME, and an MEC server according to the sixth embodiment.
Figure 16:
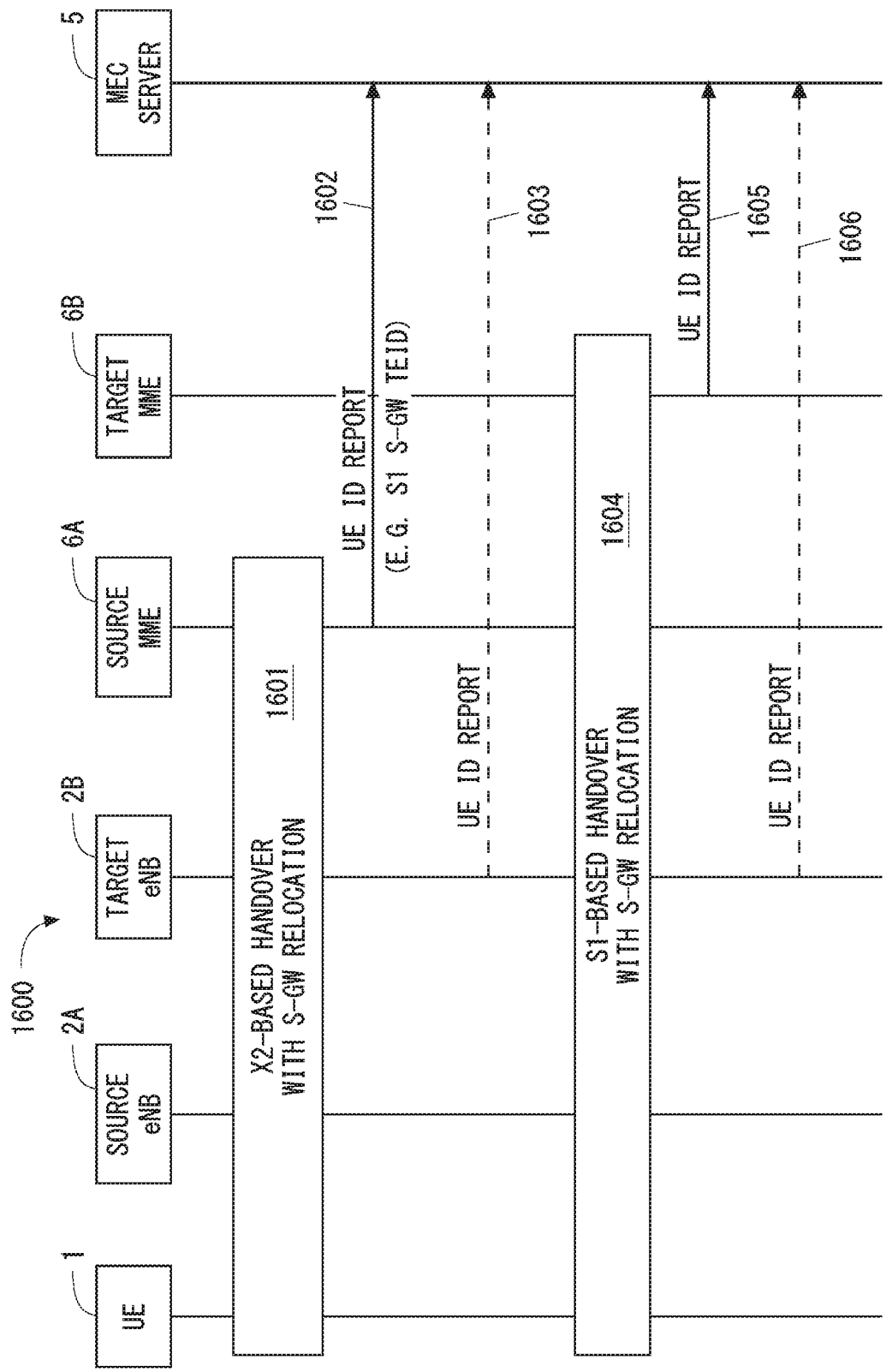
FIG. 16 is a sequence diagram showing one example of operations of an eNodeB, an MME, and an MEC server according to the sixth embodiment.
Figure 17:
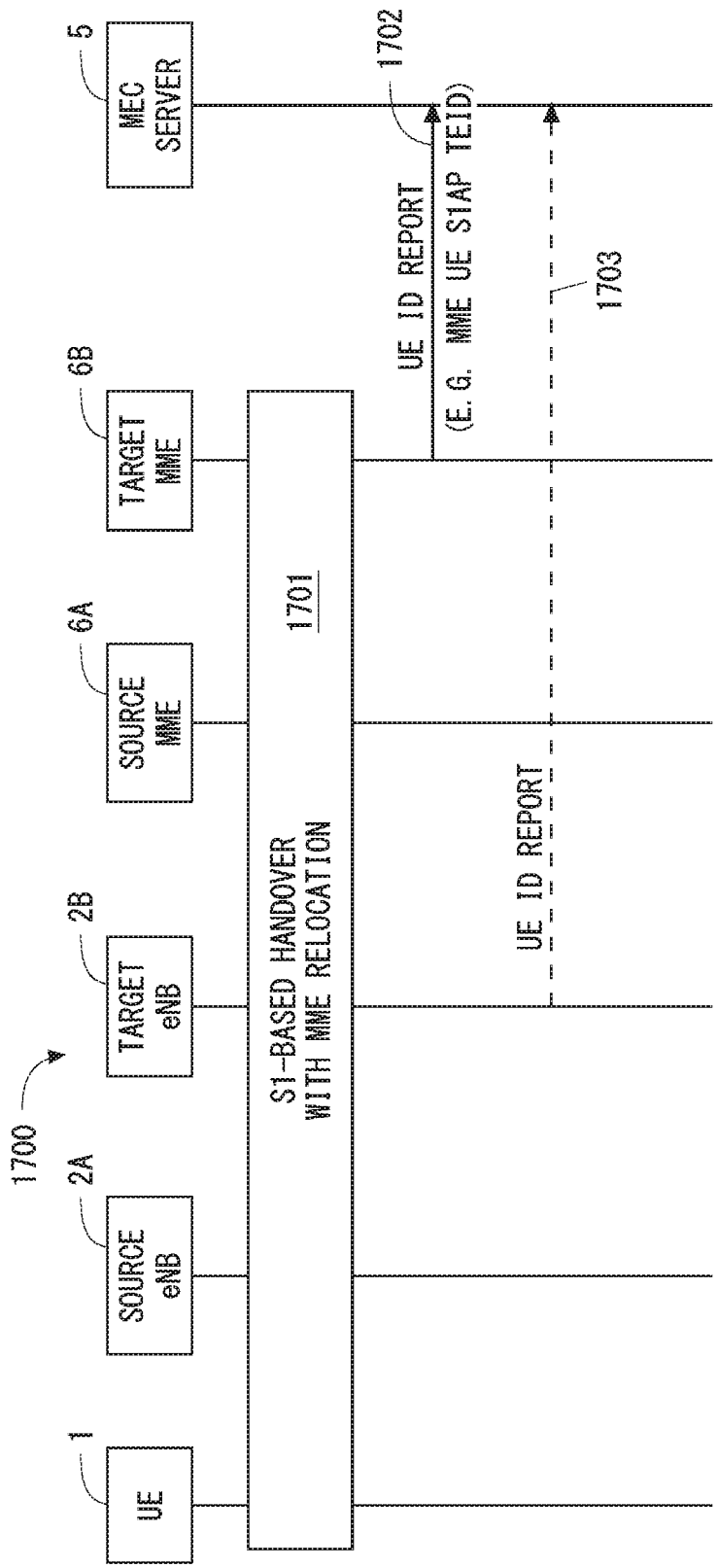
FIG. 17 is a sequence diagram showing one example of operations of an eNodeB, an MME, and an MEC server according to the sixth embodiment.

Note that, when the common UE identifier is a C-RNTI, an eNB UE S1AP ID, or an S1 eNB TEID, it changes due to the X2-based handover and the S1-based handover. When the common UE identifier is an MME UE S1AP ID, it changes due to the S1-based handover involving MME relocation. Further, when the common UE identifier is an S1 S-GW TEID, it changes due to the X2-based handover involving S-GW relocation and the S1-based handover involving S-GW relocation. Thus, as shown in FIGS. 15 to 17, the target MME 6B or the target eNodeB 2B may send the changed (or updated) common UE identifier, along with the eNB change report, to the MEC server 5. The target eNodeB 2B may send an identifier (e.g., IP address, SCEF ID, SCEF Reference ID) of the destination MEC server 5 along with the eNB change report.

FIG. 15 shows a procedure (Process 1500) in the case where a C-RNTI, an eNB UE S1AP ID, or an S1 eNB TEID is used as the common UE identifier. In this case, the common UE identifier changes due to the X2-based handover procedure (Step 1501). Accordingly, the MME 6A or the target eNodeB 2B sends to the MEC server 5 a UE ID report indicating the common UE identifier (e.g., S1 eNB TEID) changed (or updated) in the X2-based handover procedure (Step 1502 or 1503). Likewise, the common UE identifier (e.g., S1 eNB TEID) changes due to the S1-based handover procedure (Step 1504). Accordingly, the target MME 6B or the target eNodeB 2B sends to the MEC server 5 a UE ID report indicating the common UE identifier that has been changed (or updated) in the S1-based handover procedure (Step 1505 or 1506).

FIG. 16 shows a procedure (Process 1600) in the case where an S1 S-GW TEID is used as the common UE identifier. In this case, the common UE identifier changes due to the X2-based handover procedure involving S-GW relocation (Step 1601). Accordingly, the MME 6A or the target eNodeB 2B sends to the MEC server 5 a UE ID report indicating the common UE identifier (i.e., S1 S-GW TEID) changed (or updated) in the X2-based handover procedure (Step 1602 or 1603). Likewise, the common UE identifier (i.e., S1 S-GW TEID) changes due to the S1-based handover procedure involving S-GW relocation (Step 1604). Accordingly, the target MME 6B or the target eNodeB 2B sends to the MEC server 5 a UE ID report indicating the common UE identifier that has been changed (or updated) in the S1-based handover procedure involving S-GW relocation (Step 1605 or 1606).

FIG. 17 shows a procedure (Process 1700) in the case where an MME UE S1AP ID is used as the common UE identifier. In this case, the common UE identifier changes due to the S1-based handover procedure involving MME relocation (Step 1701). Accordingly, the target MME 6B or the target eNodeB 2B sends to the MEC server 5 a UE ID report indicating the common UE identifier that has been changed (or updated) in the S1-based handover procedure involving MME relocation (Step 1702 or 1703).

According to the operations described in this embodiment, the MEC server 5 can recognize a change of the eNodeB to which the UE 1 is connected.

Seventh Embodiment

In this embodiment, specific examples of communications between the eNodeB 2 and the MEC server 5 are described.

Figure 18:
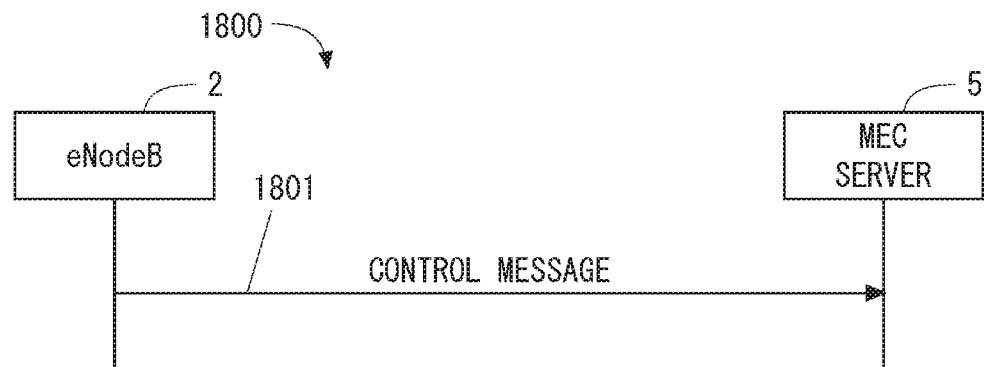
FIG. 18 is a sequence diagram showing one example of operations of an eNodeB and an MEC server according to a seventh embodiment.

FIG. 18 is a sequence diagram showing an example of operations (Process 1800) of the eNodeB 2 and the MEC server 5. In Step 1801, the eNodeB 2 sends a control message to the MEC server 5. This control message may indicate one or any combination of:
- (a) radio link quality information about each UE 1;
- (b) the amount of data in a downlink transmission buffer for each UE 1;
- (c) the amount of data in an uplink transmission buffer for each UE 1;
- (d) the number of times downlink transmission data of each UE 1 is discarded;
- (e) the number of times uplink transmission data of each UE 1 is discarded;
- (f) the amount of discarded downlink transmission data of each UE 1; and
- (g) the amount of discarded uplink transmission data of each UE 1.

This control message may be sent along with one or any combination of: the common identifier of each UE 1; an identifier of the sender eNodeB 2; an identifier (e.g., IP address, SCEF ID, SCEF Reference ID) of the destination MEC server 5; and information indicating the direction (uplink or downlink) of the control message.

The radio link quality information about each UE 1 includes one or both of downlink quality and uplink quality. The eNodeB 2 may send to the MEC server 5 the radio link quality information about all the UEs 1 in connected mode (RRC_CONNECTED). Alternatively, the eNodeB 2 may send to the MEC server 5 the radio link quality information about only the UEs 1 for which there is pending uplink data or pending downlink data. The radio link quality information may indicate the average quality (e.g., Reference Signal Received Power (RSRP) or Reference Signal Received Quality (RSRQ)) over a specified bandwidth (e.g., Resource Blocks (RBs)), or may indicate the average quality of each of the plurality of RB groups obtained by dividing the specified bandwidth. Further, the radio link quality information may be sent along with information indicating the index of the specified bandwidth (e.g., Resource Blocks Identifier (RBID)). The MEC server 5 may send, to the eNodeB 2, a configuration (e.g., a reporting interval) for reporting of the radio link quality information.

The amount of data in the downlink transmission buffer for each UE 1 indicates the total size of pending downlink data of each UE 1 held in the eNodeB 2. The eNodeB 2 may send, to the MEC server 5, the amount of data in the downlink transmission buffer at the timing of sending data to a specific UE 1. The amount of data in the uplink transmission buffer for each UE 1 indicates the total size of pending uplink data held in each UE 1. The eNodeB 2 may send, to the MEC server 5, the amount of data in the uplink transmission buffer at the timing of receiving a report regarding a buffer size from a specific UE 1. The MEC server 5 may send, to the eNodeB 2, a configuration (e.g., a reporting interval) for reporting of the amount of data in the transmission buffer.

The number of times downlink transmission data of each UE 1 is discarded indicates the number of times downlink transmission data held in a downlink transmission buffer for each UE 1 is discarded without being transmitted. The amount of discarded downlink transmission data of each UE 1 indicates the total size of downlink transmission data discarded without being transmitted. The number of times uplink transmission data of each UE 1 is discarded indicates the number of times uplink transmission data held in an uplink transmission buffer of each UE 1 is discarded without being transmitted. The amount of discarded uplink transmission data of each UE 1 indicates the total size of uplink transmission data discarded without being transmitted. The MEC server 5 may request the eNodeB 2 to adjust scheduling parameters to be taken into consideration at the time of resource allocation to each UE 1, according to the number of times downlink (or uplink) transmission data is discarded, or the amount of discarded downlink (or uplink) transmission data, or both.

Figure 19:
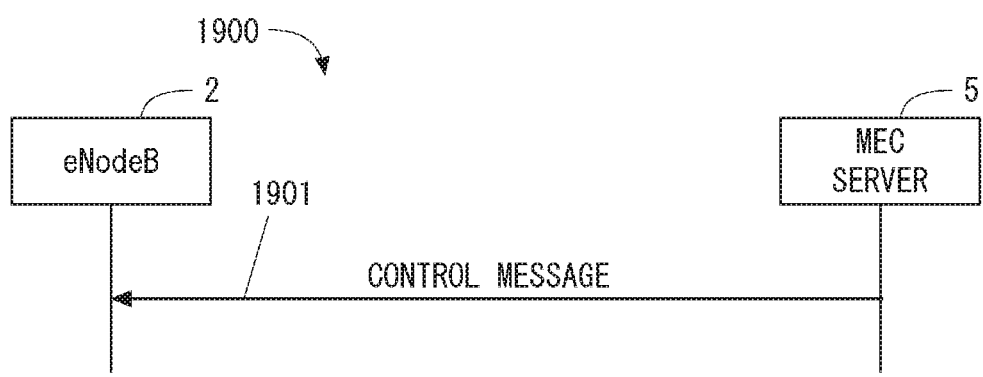
FIG. 19 is a sequence diagram showing one example of operations of an eNodeB and an MEC server according to an eighth embodiment.

FIG. 19 is a sequence diagram showing another example of operations (Process 1900) of the eNodeB 2 and the MEC server 5. In Step 1901, the MEC server 5 sends a control message to the eNodeB 2. This control message may indicate one or any combination of:
- (a) a total size of a plurality of data packets transmitted in a communication event of the target UE 1 and a transmission deadline of the plurality of data packets;
- (b) a priority level of the target UE 1 or another UE 1 to be taken into consideration by an uplink scheduler or a downlink scheduler of the eNodeB 2;
- (c) a delay threshold of the target UE to be taken into consideration by the uplink scheduler or the downlink scheduler; and
- (d) a stop request for uplink transmission or downlink transmission of the target UE 1.

This control message may be sent along with one or any combination of: the common identifier of each UE 1; an identifier (e.g., IP address, SCEF ID, SCEF Reference ID) of the sender MEC server 5; an identifier of the destination eNodeB 2; and information indicating the direction (uplink or downlink) of the control message.

One communication event between an application of the UE 1 and an MEC application may also be referred to as a communication transaction or a communication flow. One communication event, one communication transaction, or one communication flow includes unidirectional (i.e., DL or UL) or bidirectional (i.e., DL and UL) data transmission regarding a specific service. One communication event may be transmission of data (e.g., image data or location data of Global Navigation Satellite Systems (GNSS)) handled in the application layer. Specifically, for example, one communication event may be transmission of one or more image data from the MEC application to the application of the UE 1. In this case, the communication event includes at least DL transmission of one or more image data from the MEC server 5 to the UE 1. Further, this communication event may include UL transmission of user data (e.g., a request message for image data and a response message based on reception of the image data) from the UE 1 to the MEC server 5.

The total size of the plurality of data packets may indicate the total size of data packets sent in unidirectional (i.e., DL or UL) transmission in one communication event. Alternatively, the total size of the plurality of data packets may indicate the total size of DL data packets of DL transmission and the total size of UL data packets of UL transmission in one communication event.

The transmission deadline for the plurality of data packets means a time limit by which transmission of the plurality of data packets regarding one communication event should be completed. The transmission deadline is requested by an application. The transmission deadline may be sent by the UE 1. The transmission deadline can also be referred to as a transmission time limit. Alternatively, the transmission deadline can be referred to as a maximum transmission delay allowed by an application. The transmission deadline can be defined in various manners. For example, the transmission deadline may indicate a time limit for the completion of transmission by a sender in the application layer (i.e., the application of the UE 1 or the MEC application). Alternatively, the transmission deadline may indicate a time limit for the completion of transmission by a sender in a wireless layer (i.e., the UE 1 or the eNodeB 2). Alternatively, the transmission deadline may indicate a time limit for the completion of reception by a receiver in the application layer (i.e., the application of the UE 1 or the MEC application). Alternatively, the transmission deadline may indicate a time limit for the completion of reception by a receiver in the wireless layer (i.e., the UE 1 or the eNB 2). Alternatively, more specifically speaking, the transmission deadline may indicate a time period from when a sender in the application layer starts transmission of the first data packet regarding one communication event to when a receiver in the application layer completes reception of the last data packet regarding the one communication event. Alternatively, the transmission deadline may indicate a time period from when a sender in the wireless layer starts transmission of the first data packet regarding one communication event to when a receiver in the wireless layer completes reception of the last data packet regarding the one communication event.

The total size and the transmission deadline for the plurality of data packets to be transmitted between the UE 1 and the MEC application in one communication event are used by the eNodeB 2 to adapt the operation of the eNodeB 2 to communication characteristics of the MEC application. In other words, the MEC control information indicating the total size and the transmission deadline allows the eNodeB 2 to adapt its operation to communication characteristics of the MEC application. Specifically, the eNodeB 2 may acquire a DL transmission history of the eNodeB 2 related to the communication event or a UL transmission history of the UE 1 related thereto, and calculate a size of remaining pending data packets to be transmitted based on the acquired transmission history and the above-described total size.

The MEC server 5 may determine or change the MEC control information on the basis of the contents of the control message sent from the eNodeB 2. Further, the MEC server 5 may determine the probability of achievement of the throughput or the transmission deadline on the basis of the radio channel quality (e.g., Channel Quality Indicator (CQI)) of each UE 1 sent from the eNodeB 5, and may determine or change the MEC control information on the basis of this probability.

The priority level of each UE 1 is taken into consideration by the scheduler of the eNodeB 2. The delay threshold (or delay budget) of each UE 1 is also taken into consideration by the scheduler of the eNodeB 2. In some implementations, the scheduler of the eNodeB 2 may prioritize a plurality of UEs 1 based on the received priority level and select one or more UEs 1 to be scheduled in each transmission period (i.e., subframe). In some implementations, the scheduler of the eNodeB 2 may use a scheduling metric (i.e., EDF metric) based on an Earliest Deadline First (EDF) approach. The EDF metric is in proportion to the reciprocal of the difference between the delay threshold and the head of line delay. The head of line delay means a delay of the first packet of the user's pending packets to be transmitted.

The stop request for uplink transmission or downlink transmission requests the eNodeB 2 to stop resource application to uplink transmission or downlink transmission of the designated UE 1. This stop request may indicate a stop period.

Figure 20:
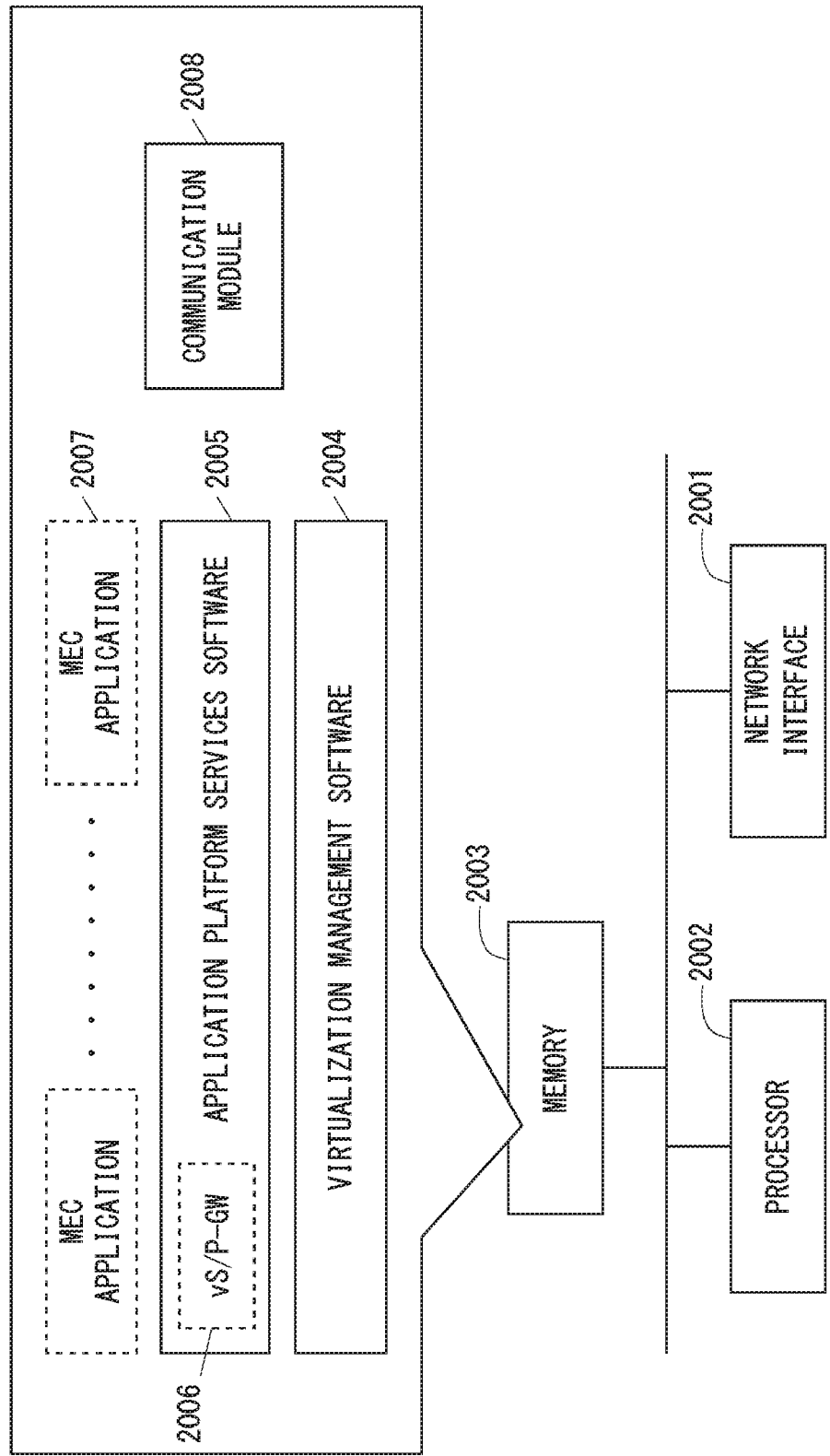
FIG. 20 is a diagram showing a configuration example of an MEC server according to several embodiments.

Lastly, configuration examples of the MEC server 5, the eNodeB 2, and the HSS 9 according to the above embodiments will be described. FIG. 20 is a block diagram showing a configuration example of the MEC server 5. Referring to FIG. 20, the MEC server 5 includes hardware components including a network interface 2001, a processor 2002, and a memory (or storage) 2003. The network interface 2001 is used to communicate with the eNodeB 2, the MME 6, the HSS 9, and other network nodes. The network interface 2001 may include, for example, a network interface card (NIC) conforming to the IEEE 802.3 series.

The processor 2002 loads software (computer program) from the memory 2003 and executes the loaded software, thereby performing processing of the MEC server 5 described in the above-described embodiments with reference to the drawings. The processor 2002 may be, for example, a microprocessor, a Micro Processing Unit (MPU), or a Central Processing Unit (CPU). The processor 2002 may include a plurality of processors.

The memory 2003 is composed of a combination of a volatile memory and a nonvolatile memory. The memory 2003 may include a plurality of memory devices that are physically independent from one another. The volatile memory is, for example, a Static Random Access Memory (SRAM), a Dynamic RAM (DRAM) or a combination thereof. The nonvolatile memory is, for example, a mask Read Only Memory (MROM), an Electrically Erasable Programmable ROM (EEPROM), a flash memory, a hard disc drive, or any combination thereof. The memory 2003 may include a storage located apart from the processor 2002. In this case, the processor 2002 may access the memory 2003 via an I/O interface (not shown).

In the example shown in FIG. 15, the memory 2003 is used to store software modules 2004-2007 for MEC and a communication module 2008 for communicating with the eNodeB 2. The virtualization management software 2004 is executed by the processor 2002 to virtualize hardware components including the network interface 2001, the processor 2002, and the memory 2003 and provide Infrastructure as a Service (IaaS) or Platform as a Service (PaaS) facilities, thereby providing a hosting environment for applications.

The application platform services software 2005 is executed by the processor 2002 to provide applications with middleware services such as a communication service, a radio network information service, and a traffic offload function.

The application platform services software 2005 may include a virtualized S/P-GW software module 2006. The virtualized S/P-GW software module 2006 uses the hosting environment provided by the virtualization management software 1504, and provides functions of S-GW or P-GW or both.

The one or more applications 2007 are MEC applications hosted on the MEC server 5. The one or more applications 2007 communicate with the UE 1 using communication services provided by the application platform services software 2005 or the communication module 2008.

The communication module 2008 is executed by the processor 2002 and provides the MEC application 2007 with communication services for communicating with RAN nodes (e.g., the eNodeB 2) or core network nodes (e.g., the MME 6 and the HSS 9) according to the above-described embodiments. In some implementations, the communication module 2008 may be included in the application platform services software 2005.

Figure 21:
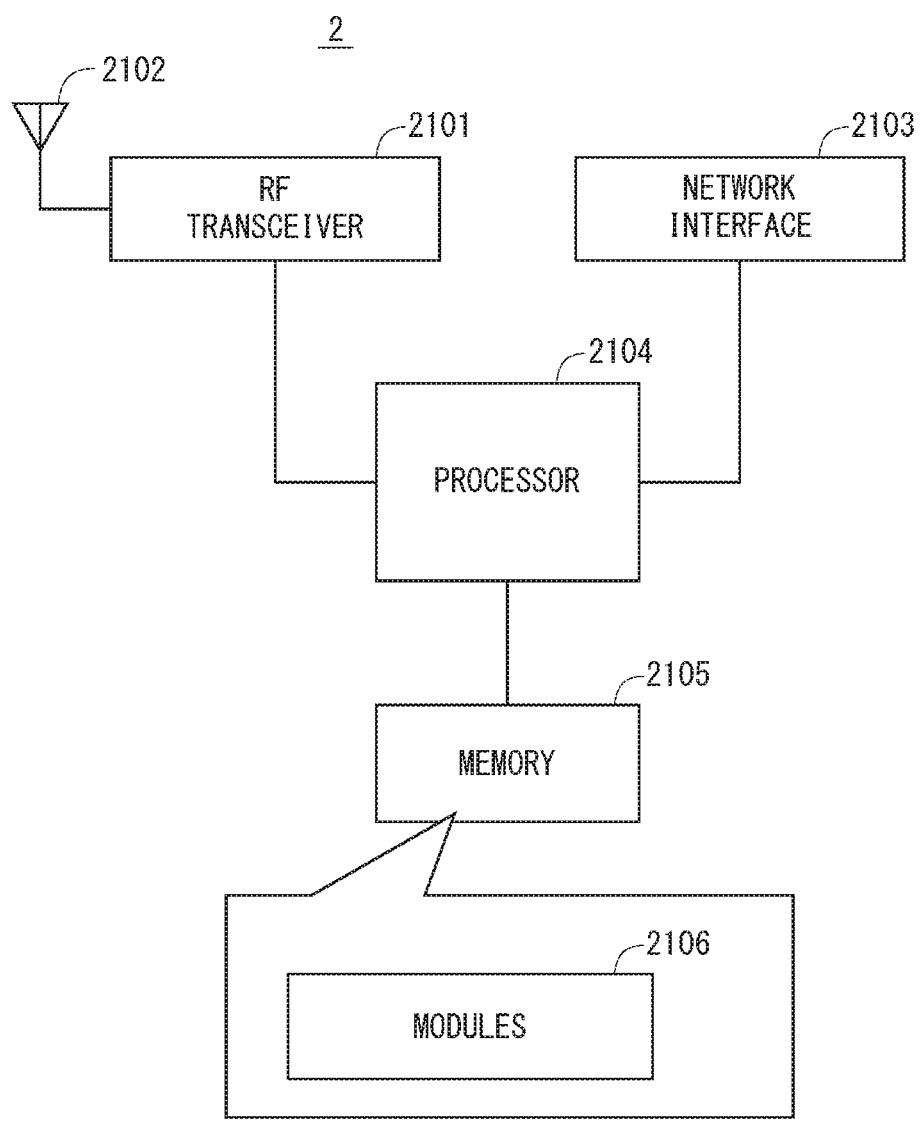
FIG. 21 is a diagram showing a configuration example of an eNodeB according to several embodiments.

FIG. 21 is a block diagram showing a configuration example of the eNodeB 2 according to the above-described embodiments. Referring to FIG. 21, the eNodeB 2 includes an RF transceiver 2101, a network interface 2103, a processor 2104, and a memory 2105. The RF transceiver 2101 performs analog RF signal processing to communicate with the UE 1. The RF transceiver 2101 may include a plurality of transceivers. The RF transceiver 2101 is coupled to an antenna 2102 and the processor 2104. In some implementations, the RF transceiver 2101 receives modulated symbol data (or OFDM symbol data) from the processor 2104, generates a transmission RF signal, and supplies the transmission RF signal to the antenna 2102. Further, the RF transceiver 2101 generates a baseband reception signal based on a reception RF signal received by the antenna 2102, and supplies the baseband reception signal to the processor 2104. As described above, the eNodeB 2 may be a BBU (or REC) used in the C-RAN architecture. In this case, the eNodeB 2 may not include the RF transceiver 2101.

The network interface 2103 is used to communicate with network nodes (e.g., the MME 6 and the S/P-GW 7) and the MEC server 5. The network interface 2103 may include, for example, a network interface card (NIC) conforming to the IEEE 802.3 series.

The processor 2104 performs digital baseband signal processing (i.e., data-plane processing) and control-plane processing for radio communication. In the case of LTE and LTE-Advanced, for example, the digital baseband signal processing performed by the processor 2104 may include signal processing of a PDCP layer, an RLC layer, a MAC layer, and a PHY layer. Further, the control-plane processing by the processor 2104 may include processing of the S1 protocol, the RRC protocol, and the MAC CEs.

The processor 2104 may include a plurality of processors. The processor 2104 may include, for example, a modem processor (e.g., a DSP) that performs the digital baseband signal processing and a protocol stack processor (e.g., a CPU or an MPU) that performs the control-plane processing.

The memory 2105 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 2105 may include a storage located apart from the processor 2104. In this case, the processor 2104 may access the memory 2105 via the network interface 2103 or an I/O interface (not shown).

The memory 2105 may store one or more software modules (computer programs) 2106 including instructions and data to perform the processing of the eNodeB 2 described in the above embodiments. In some implementations, the processor 2104 may be configured to load the software modules 2106 from the memory 2105 and execute the loaded software modules, thereby performing the processing of the eNodeB 2 described in the above embodiments with reference to the drawings.

Figure 22:
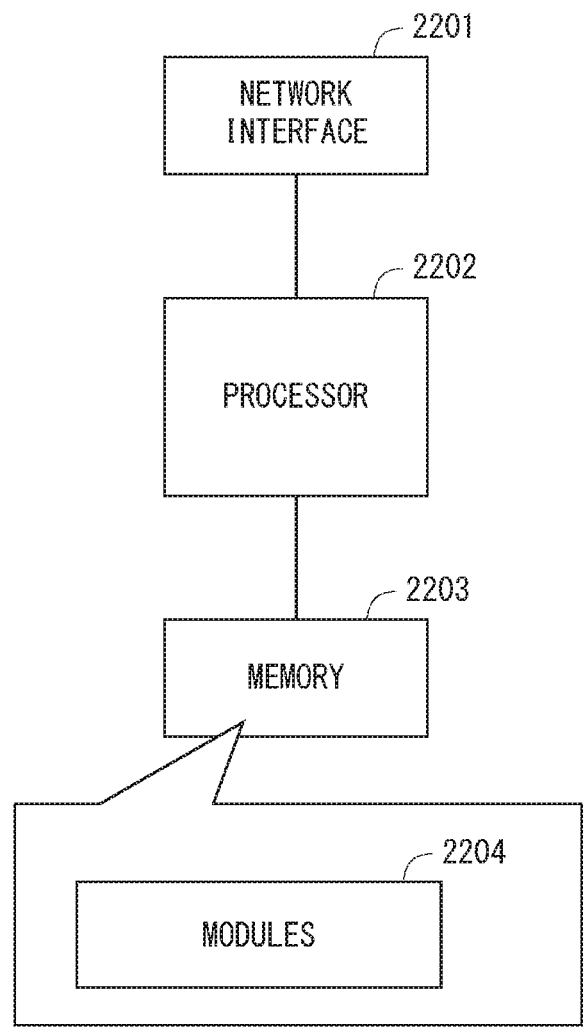
FIG. 22 is a diagram showing a configuration example of an MME according several embodiments.

FIG. 22 is a block diagram showing a configuration example of the MME 6. Referring to FIG. 22, the MME 6 includes a network interface 2201, a processor 2202, and a memory 2203. The network interface 2201 is used to communicate with network nodes (e.g., the eNodeB 2, the MEC server 5, the S/P-GW 7, and the HSS 9). The network interface 2201 may include, for example, a network interface card (NIC) conforming to the IEEE 802.3 series.

The processor 2202 may be a microprocessor, an MPU, or a CPU. The processor 2202 may include a plurality of processors.

The memory 2203 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 2203 may include a storage located apart from the processor 2202. In this case, the processor 2202 may access the memory 2203 via the network interface 2201 or an I/O interface (not shown).

The memory 2203 may store one or more software modules (computer programs) 2204 including instructions and data to perform the processing of the network node described in the above embodiments. In some implementations, the processor 2204 may be configured to load the one or more software modules 2204 from the memory 2203 and execute the loaded software modules, thereby performing the processing of the MME 6 described in the above embodiments.

The HSS 9 may have a configuration similar to that of the MME 6 shown in FIG. 22.

As described above with reference to FIGS. 20 to 22, each of the processors included in the MEC server 5, the eNodeB 2, the MME 6, and the HSS9 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

As already described, the above embodiments may be applied to the fifth generation mobile communication system (5G), which is under standardization by the 3GPP. The 5G system is also referred to as a Next Generation (NextGen) System (NG System). A new RAT for the NG System is referred to as a New Radio (NR), 5G RAT, or NG RAT. A new radio access network (RAN) and a core network for the NG system are referred to as a NextGen RAN (NG RAN) or a New RAN, and a NextGen Core (NG Core), respectively. A radio terminal (User Equipment (UE)) capable of being connected to the NG System is referred to as a NextGen UE (NG UE). A base station that supports the New Radio (NR) is referred to as an NG NodeB (NG NB), an NR NodeB (NR NB), or a gNB. One or more control plane entities within the NG Core, which correspond to the MME, HSS, and S/P-GW in LTE, are referred to as Control Plane Network Functions (CP NFs). One or more user plane entities within the NG Core, which correspond to the user plane of the S/P-GW in LTE, are referred to as User Plane Network Functions (UP NFs). The names of the RAT, UE, radio access network, core network, network entities (nodes), protocol layers and the like for the NG System will be determined in the future as standardization work progresses.

The first to ninth embodiments provide the examples in which the MEC server 5 is coupled to the eNodeB 2 which serves as the RAN node. Instead, the MEC server 5 may be coupled to another RAN node. The MEC server 5 may be coupled to a Home eNodeB Gateway (HeNB-GW) or to an X2 Gateway (X2-GW). Alternatively, the MEC server 5 may be coupled to an integrated RAN node that has the functionalities of both the HeNB-GW and the X2-GW. The HeNB-GW is arranged between an HeNB and the EPC 4 and relays control plane signals (i.e., S1AP messages) between the HeNB and the EPC 4 (i.e., the MME 6). The HeNB-GW may terminate S1-U interfaces with the S/P-GW 7 (or the virtualized S/P-GW 8) and with the HeNB. The X2-GW is arranged between two eNodeBs and relays control plane signals (i.e., X2AP messages) between the two eNodeBs. The X2-GW may further relay user plane data between the two eNodeBs.

The embodiments described above are merely examples of applications of the technical ideas obtained by the present inventors. These technical ideas are not limited to the above-described embodiments and various modifications can be made thereto.

For example, the whole or part of the above embodiments can be described as, but not limited to, the following supplementary notes.

(Supplementary Note A1)
A network entity comprising:
at least one memory; and
at least one processor connected to the memory and configured to:
  each time a second identifier to be used by a radio access network node for identifying a radio terminal is changed, receive an updated value of the second identifier from the radio access network node or a mobility management entity; and
  communicate with the radio access network node by using the second identifier.

(Supplementary Note A2)
The network entity according to Supplementary Note A1, wherein the at least one processor is configured to associate the second identifier with a first identifier to be used by a service, an application, or the network entity for identifying the radio terminal.

(Supplementary Note A3)
The network entity according to Supplementary Note A1 or A2, wherein the network entity functions as a Service Capability Exposure Function (SCEF) specified in Third Generation Partnership Project (3GPP) standard.

(Supplementary Note A4)
The network entity according to any one of Supplementary Notes A1 to A3, wherein the network entity functions as an edge server that provides at least one of computing resources and storage resources for edge computing regarding a service or application directed to the radio terminal.

(Supplementary Note A5)
The network entity according to any one of Supplementary Notes A1 to A4, wherein
the second identifier is allocated by the mobility management entity, and
the at least one processor is configured to, when the second identifier is changed due to a mobility of the radio terminal involving a change of the mobility management entity, receive an updated value of the second identifier from an old mobility management entity before the mobility, from a new mobility management entity after the mobility, or from the radio access network node.

(Supplementary Note A6)
The network entity according to Supplementary Note A5, wherein the second identifier includes an MME UE S1AP ID.

(Supplementary Note A7)
The network entity according to any one of Supplementary Notes A1 to A4, wherein
the second identifier is allocated by a user plane node that provides user data transfer of the radio terminal, and
the at least one processor is configured to, when the second identifier is changed due to a mobility of the radio terminal involving a change of the user plane node, receive an updated value of the second identifier from the mobility management entity or the radio access network node.

(Supplementary Note A8)
The network entity according to Supplementary Note A7, wherein the second identifier includes an S1 S-GW TEID.

(Supplementary Note A9)
The network entity according to any one of Supplementary Notes A1 to A4, wherein
the second identifier is allocated by the radio access network node, and
the at least one processor is configured to, when the second identifier is changed due to a mobility of the radio terminal involving a change of the radio access network node, or due to a state transition of the radio terminal between a connected mode and an idle mode, receive an updated value of the second identifier from an old radio access network node before the mobility, from a new radio access network node after the mobility, or from the mobility management entity.

(Supplementary Note A10)
The network entity according to Supplementary Note A9, wherein the second identifier includes one or any combination of a C-RNTI, an eNB UE S1AP ID, and an S1 eNB TEID.

(Supplementary Node A11)
A method in a network entity, the method comprising:
each time a second identifier to be used by a radio access network node for identifying a radio terminal is changed, receiving an updated value of the second identifier from the radio access network node or a mobility management entity; and
communicating with the radio access network node by using the second identifier.

(Supplementary Node A11)
A program for causing a computer to execute a method in a network entity, wherein the method comprises:
each time a second identifier to be used by a radio access network node for identifying a radio terminal is changed, receiving an updated value of the second identifier from the radio access network node or a mobility management entity; and
communicating with the radio access network node by using the second identifier.

(Supplementary Note B1)
A radio access network node located in a radio access network, the radio access network node comprising:
at least one memory; and
at least one processor coupled to the at least one memory and configured to:
  during a procedure for an inbound handover of a radio terminal from a source radio access network node, receive, from the source radio access network node or a mobility management entity, a context regarding communication with a network entity; and communicate with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note B2)

The radio access network node according to Supplementary Note B1, wherein the context includes an identifier of the network entity.

(Supplementary Note B3)

The radio access network node according to Supplementary Note B1 or B2, wherein the at least one processor is configured to notify the network entity of a change of a radio access network node to which the radio terminal is connected.

(Supplementary Note B4)

The radio access network node according to any one of Supplementary Notes B1 to B3, wherein the at least one processor is configured to notify the network entity of a change in a second identifier to be used for identifying the radio terminal.

(Supplementary Note B5)

The radio access network node according to Supplementary Note B4, wherein the second identifier includes one or any combination of a C-RNTI, an eNB UE S1AP ID, and an S1 eNB TEID.

(Supplementary Note B6)

A method in a radio access network node located in a radio access network, the method comprising:

during a procedure for an inbound handover of a radio terminal from a source radio access network node, receiving, from the source radio access network node or a mobility management entity, a context regarding communication with a network entity; and communicating with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note B6)

A program for causing a computer to perform a method in a radio access network node located in a radio access network, wherein the method comprises:

during a procedure for an inbound handover of a radio terminal from a source radio access network node, receiving, from the source radio access network node or a mobility management entity, a context regarding communication with a network entity; and communicating with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note C1)

A mobility management entity comprising:

at least one memory; and at least one processor coupled to the at least one memory and configured to:

during a mobility procedure of a radio terminal involving a change of a mobility management entity, receive, from an old mobility management entity, a context regarding communication with a network entity; and communicate with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note C2)

The mobility management entity according to Supplementary Note C1, wherein the context includes an identifier of the network entity.

(Supplementary Note C3)

The mobility management entity according to Supplementary Note C1 or C2, wherein the at least one processor is configured to notify the network entity of a change of a mobility management node that provides mobility management of the radio terminal.

(Supplementary Note C4)

The mobility management entity according to any one of Supplementary Notes C1 to C3, wherein the at least one processor is configured to notify the network entity of a change in a second identifier to be used for identifying the radio terminal.

(Supplementary Note C5)

The mobility management entity according to Supplementary Note C4, wherein the second identifier includes one or any combination of a C-RNTI, an MME UE S1AP ID, an eNB UE S1AP ID, an S1 S-GW TEID, and an S1 eNB TEID.

(Supplementary Note C6)

A method in a mobility management entity, the method comprising:

during a mobility procedure of a radio terminal involving a change of a mobility management entity, receive, from an old mobility management entity, a context regarding communication with a network entity; and communicating with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note C7)

A program for causing a computer to perform a method in a mobility management entity, wherein the method comprises:

during a mobility procedure of a radio terminal involving a change of a mobility management entity, receive, from an old mobility management entity, a context regarding communication with a network entity; and communicating with the network entity by using the context, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to the radio terminal.

(Supplementary Note D1)

A radio access network node located in a radio access network, the radio access network node comprising:
  at least one memory; and
  at least one processor coupled to the at least one memory and configured to transmit a control message to a network entity, wherein
  the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and the control message indicates one or any combination of:
  (a) radio link quality information about each radio terminal;
  (b) the amount of data in a downlink transmission buffer for each radio terminal;
  (c) the amount of data in an uplink transmission buffer for each radio terminal;
  (d) the number of times downlink transmission data of each radio terminal is discarded;
  (e) the number of times uplink transmission data of each radio terminal is discarded;
  (f) the amount of discarded downlink transmission data of each radio terminal; and
  (g) the amount of discarded uplink transmission data of each radio terminal.

(Supplementary Note D2)

A network entity comprising:
  at least one memory; and
  at least one processor coupled to the at least one memory and configured to transmit a control message to a radio access network node, wherein
  the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and the control message indicates one or any combination of:
  (a) a total size of a plurality of data packets transmitted in a communication event of the radio terminal and a transmission deadline of the plurality of data packets;
  (b) a priority level of the radio terminal or another radio terminal to be taken into consideration by an uplink scheduler or a downlink scheduler of the radio access network node;
  (c) a delay threshold of the radio terminal to be taken into consideration by the uplink scheduler or the downlink scheduler; and
  (d) a stop request for uplink transmission or downlink transmission of the radio terminal.

(Supplementary Note D3)

A method in a radio access network node located in a radio access network, the method comprising transmitting a control message to a network entity, wherein
  the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and
  the control message indicates one or any combination of:
  (a) radio link quality information about each radio terminal;
  (b) the amount of data in a downlink transmission buffer for each radio terminal;
  (c) the amount of data in an uplink transmission buffer for each radio terminal;
  (d) the number of times downlink transmission data of each radio terminal is discarded;
  (e) the number of times uplink transmission data of each radio terminal is discarded;
  (f) the amount of discarded downlink transmission data of each radio terminal; and
  (g) the amount of discarded uplink transmission data of each radio terminal.

(Supplementary Note D4)

A method in a network entity, the method comprising transmitting a control message to a radio access network node, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and
  the control message indicates one or any combination of:
  (a) a total size of a plurality of data packets transmitted in a communication event of the radio terminal and a transmission deadline of the plurality of data packets;
  (b) a priority level of the radio terminal or another radio terminal to be taken into consideration by an uplink scheduler or a downlink scheduler of the radio access network node;
  (c) a delay threshold of the radio terminal to be taken into consideration by the uplink scheduler or the downlink scheduler; and
  (d) a stop request for uplink transmission or downlink transmission of the radio terminal.

(Supplementary Note D5)

A program for causing a computer to perform a method in a radio access network node located in a radio access network, the method comprising transmitting a control message to a network entity, wherein
  the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and the control message indicates one or any combination of:
  (a) radio link quality information about each radio terminal;
  (b) the amount of data in a downlink transmission buffer for each radio terminal;
  (c) the amount of data in an uplink transmission buffer for each radio terminal;
  (d) the number of times downlink transmission data of each radio terminal is discarded;
  (e) the number of times uplink transmission data of each radio terminal is discarded;
  (f) the amount of discarded downlink transmission data of each radio terminal; and
  (g) the amount of discarded uplink transmission data of each radio terminal.

(Supplementary Note D6)

A program for causing a computer to perform a method in a network entity, the method comprising transmitting a control message to a radio access network node, wherein the network entity functions as a Service Capability Exposure Function (SCEF) specified in Third Generation Partnership Project (3GPP) standard, or functions as an edge server that provides at least one of computing resources and storage resources for edge computing regarding a service or application directed to a radio terminal, and the control message indicates one or any combination of:

(a) a total size of a plurality of data packets transmitted in a communication event of the radio terminal and a transmission deadline of the plurality of data packets;

(b) a priority level of the radio terminal or another radio terminal to be taken into consideration by an uplink scheduler or a downlink scheduler of the radio access network node;

(c) a delay threshold of the radio terminal to be taken into consideration by the uplink scheduler or the downlink scheduler; and (d) a stop request for uplink transmission or downlink transmission of the radio terminal.

(Supplementary Note 1)

A network entity comprising:

at least one memory; and at least one processor coupled to the at least one memory and configured to:

send, to a mobility management entity or a subscriber server, a request message in order to configure the mobility management entity to report a second identifier to be used by a radio access network node for identifying a radio terminal;

receive the second identifier from the mobility management entity directly or through the subscriber server; and communicate with the radio access network node by using the second identifier.

(Supplementary Note 2)

The network entity according to Supplementary Note 1, wherein the at least one processor is configured to associate the second identifier with a first identifier to be used by a service, an application, or the network entity for identifying the radio terminal.

(Supplementary Note 3)

The network entity according to Supplementary Note 1 or 2, wherein the network entity functions as a Service Capability Exposure Function (SCEF) specified in Third Generation Partnership Project (3GPP) standard.

(Supplementary Note 4)

The network entity according to any one of Supplementary Notes 1 to 3, wherein the network entity functions as an edge server that provides at least one of computing resources and storage resources for edge computing regarding a service or application directed to the radio terminal.

(Supplementary Note 5)

The network entity according to any one of Supplementary Notes 1 to 4, wherein the request message causes the mobility management entity or the subscriber server to continuously report a change in the second identifier, and the at least one processor is configured to receive an updated value of the second identifier from the mobility management entity directly or through the subscriber server each time the second identifier is changed.

(Supplementary Note 6)

The network entity according to Supplementary Note 5, wherein the second identifier is changed due to a mobility of the radio terminal, or due to a state transition of the radio terminal between a connected mode and an idle mode.

(Supplementary Note 7)

The network entity according to any one of Supplementary Notes 1 to 6, wherein the at least one processor is further configured to receive, from the mobility management entity or the radio access network node, a notification indicating an occurrence of a state transition of the radio terminal between a connected mode and an idle mode.

(Supplementary Note 8)

The network entity according to any one of Supplementary Notes 1 to 7, wherein the at least one processor is further configured to, when the radio access network node to which the radio terminal is connected is changed, receive a notification indicating a change of the radio access network node from the mobility management entity, from a radio access network node before the change, or from a radio access network node after the change.

(Supplementary Note 9)

The network entity according to any one of Supplementary Notes 1 to 8, wherein the at least one processor is further configured to, when the second identifier is changed due to a mobility of the radio terminal involving a change of the mobility management entity, receive an updated value of the second identifier from an old mobility management entity before the mobility or from a new mobility management entity after the mobility.

(Supplementary Note 10)

The network entity according to any one of Supplementary Notes 1 to 9, wherein the second identifier includes one or any combination of a C-RNTI, an MME a UE S1AP ID, an eNB UE S1AP ID, an S1 S-GW TEID, and an S1 eNB TEID.

(Supplementary Note 11)

A mobility management entity comprising:

at least one memory; and at least one processor coupled to the at least one memory and configured to:

receive, from a network entity directly or through a subscriber server, a request message in order to configure the mobility management entity to report a second identifier to be used by a radio access network node for identifying a radio terminal; and send the second identifier to the network entity directly or through the subscriber server.

(Supplementary Note 12)

The mobility management entity according to Supplementary Note 11, wherein the network entity functions as a Service Capability Exposure Function (SCEF) specified in Third Generation Partnership Project (3GPP) standard.

(Supplementary Note 13)

The mobility management entity according to Supplementary Note 11 or 12, wherein the network entity functions as an edge server that provides at least one of computing resources and storage resources for edge computing regarding a service or application directed to the radio terminal.

(Supplementary Note 14)

The mobility management entity according to any one of Supplementary Notes 11 to 13, wherein the request message causes the mobility management entity or the subscriber server to continuously report a change in the second identifier, and the at least one processor is configured to send an updated value of the second identifier to the network entity directly or through the subscriber server each time the second identifier is changed.

(Supplementary Note 15)

The mobility management entity according to Supplementary Note 14, wherein the second identifier is changed due to a mobility of the radio terminal, or due to a state transition of the radio terminal between a connected mode and an idle mode.

(Supplementary Note 16)

The mobility management entity according to any one of Supplementary Notes 11 to 15, wherein the at least one processor is further configured to notify the network entity of an occurrence of a state transition of the radio terminal between a connected mode and an idle mode.

(Supplementary Note 17)

The mobility management entity according to any one of Supplementary Notes 11 to 16, wherein the at least one processor is further configured to, when the radio access network node to which the radio terminal is connected is changed, notify the network entity of a change of the radio access network node.

(Supplementary Note 18)

The mobility management entity according to any one of Supplementary Notes 11 to 17, wherein the second identifier includes one or any combination of a C-RNTI, an MME UE S1AP ID, an eNB UE S1AP ID, an S1 S-GW TEID, and an S1 eNB TEID.

(Supplementary Note 19)

A method in a network entity, the method comprising:

sending, to a mobility management entity or a subscriber server, a request message in order to configure the mobility management entity to report a second identifier to be used by a radio access network node for identifying a radio terminal;

receiving the second identifier from the mobility management entity directly or through the subscriber server; and communicating with the radio access network node by using the second identifier.

(Supplementary Note 20)

A method in a mobility management entity, the method comprising:

receiving, from a network entity directly or through a subscriber server, a request message in order to configure the mobility management entity to report a second identifier to be used by a radio access network node for identifying a radio terminal; and sending the second identifier to the network entity directly or through the subscriber server.

(Supplementary Note 21)

A program for causing a computer to perform a method in a network entity, wherein the method comprises:

sending, to a mobility management entity or a subscriber server, a request message in order to configure the mobility management entity to report a second identifier to be used by a radio access network node for identifying a radio terminal;

receiving the second identifier from the mobility management entity directly or through the subscriber server; and communicating with the radio access network node by using the second identifier.

(Supplementary Note 22)

A program for causing a computer to perform a method in a mobility management entity, wherein the method comprises:

receiving, from a network entity directly or through a subscriber server, a request message in order to configure the mobility management entity to report a second identifier to be used by a radio access network node for identifying a radio terminal; and sending the second identifier to the network entity directly or through the subscriber server.

REFERENCE SIGNS LIST

1 UE
2 eNodeB
3 RADIO ACCESS NETWORK
4 CORE NETWORK
5 MEC SERVER
6 MME
7 S/P-GW
9 HSS
10 PCRF
2005 APPLICATION PLATFORM SERVICES SOFTWARE
2008 COMMUNICATION MODULE
2106 MODULE
2204 MODULE

The invention claimed is:

1. A network entity comprising:
at least one memory; and
at least one processor coupled to the at least one memory and configured to:
send, to a mobility management entity or a subscriber server, a request message in order to configure the mobility management entity to report a second identifier to be used by a radio access network node to identify a radio terminal that establishes a radio connection with the radio access network node, the radio access network node being different from the network entity;
receive the second identifier from the mobility management entity directly or through the subscriber server, the second identifier including one or any combination of a C-RNTI, an MME UE S1AP ID, an eNB UE S1AP ID, an S1 S-GW TEID, and an S1 eNB TEID; and
communicate with the radio access network node by using the second identifier.

2. The network entity according to claim 1, wherein the at least one processor is configured to associate the second identifier with a first identifier to be used by a service, an application, or the network entity for identifying the radio terminal.

3. The network entity according to claim 1, wherein the network entity functions as a Service Capability Exposure Function (SCEF) specified in Third Generation Partnership Project (3GPP) standard.

4. The network entity according to claim 1, wherein the network entity functions as an edge server that provides at least one of computing resources and storage resources for edge computing regarding a service or application directed to the radio terminal.

5. The network entity according to claim 1, wherein the request message causes the mobility management entity or the subscriber server to continuously report a change in the second identifier, and
wherein the at least one processor is configured to receive an updated value of the second identifier from the mobility management entity directly or through the subscriber server each time the second identifier is changed.

6. The network entity according to claim 5, wherein the second identifier is changed due to a mobility of the radio terminal, or due to a state transition of the radio terminal between a connected mode and an idle mode.

7. The network entity according to claim 1, wherein the at least one processor is further configured to receive, from the mobility management entity or the radio access network node, a notification indicating an occurrence of a state transition of the radio terminal between a connected mode and an idle mode.

8. The network entity according to claim 1, wherein the radio access network node is a radio access network node to which the radio terminal is connected, and
wherein the at least one processor is further configured to, if the radio access network node to which the radio terminal is connected is changed, receive a notification indicating a change of the radio access network node from the mobility management entity, from a radio access network node before the change, or from a radio access network node after the change.

9. The network entity according to claim 1, wherein the at least one processor is further configured to, if the second identifier is changed due to a mobility of the radio terminal involving a change of the mobility management entity, receive an updated value of the second identifier from an old mobility management entity before the mobility or from a new mobility management entity after the mobility.

10. A mobility management entity comprising:
at least one memory; and
at least one processor coupled to the at least one memory and configured to:
receive, from a network entity directly or through a subscriber server, a request message in order to configure the mobility management entity to report a second identifier to be used by a radio access network node to identify a radio terminal that establishes a radio connection with the radio access network node, the radio access network node being different from the network entity; and
send the second identifier to the network entity directly or through the subscriber server, the second identifier including one or any combination of a C-RNTI, an MME UE S1AP ID, an eNB UE S1AP ID, an S1 S-GW TEID, and an S1 eNB TEID.

11. The mobility management entity according to claim 10, wherein the network entity functions as a Service Capability Exposure Function (SCEF) specified in Third Generation Partnership Project (3GPP) standard.

12. The mobility management entity according to claim 10, wherein the network entity functions as an edge server that provides at least one of computing resources and storage resources for edge computing regarding a service or application directed to the radio terminal.

13. The mobility management entity according to claim 10, wherein the request message causes the mobility management entity or the subscriber server to continuously report a change in the second identifier, and
wherein the at least one processor is configured to send an updated value of the second identifier to the network entity directly or through the subscriber server each time the second identifier is changed.

14. The mobility management entity according to claim 13, wherein the second identifier is changed due to a mobility of the radio terminal, or due to a state transition of the radio terminal between a connected mode and an idle mode.

15. The mobility management entity according to claim 10, wherein the at least one processor is further configured to notify the network entity of an occurrence of a state transition of the radio terminal between a connected mode and an idle mode.

16. The mobility management entity according to claim 10, wherein the radio access network node is a radio access network node to which the radio terminal is connected, and
wherein the at least one processor is further configured to, if the radio access network node to which the radio terminal is connected is changed, notify the network entity of a change of the radio access network node.

17. A method in a network entity, the method comprising:
sending, to a mobility management entity or a subscriber server, a request message in order to configure the mobility management entity to report a second identifier to be used by a radio access network node to identify a radio terminal that establishes a radio connection with the radio access network node, the radio access network node being different from the network entity;
receiving the second identifier from the mobility management entity directly or through the subscriber server, the second identifier including one or any combination of a C-RNTI, an MME UE S1AP ID, an eNB UE S1AP ID, an S1 S-GW TEID, and an S1 eNB TEID; and
communicating with the radio access network node by using the second identifier.

18. A method in a mobility management entity, the method comprising:
receiving, from a network entity directly or through a subscriber server, a request message in order to configure the mobility management entity to report a second identifier to be used by a radio access network node to identify a radio terminal that establishes a radio connection with the radio access network node, the radio access network node being different from the network entity; and
sending the second identifier to the network entity directly or through the subscriber server, the second identifier including one or any combination of a C-RNTI, an MME UE S1AP ID, an eNB UE S1AP ID, an S1 S-GW TEID, and an S1 eNB TEID.

* * * * *